United States Patent
Flemming et al.

(10) Patent No.: US 11,139,582 B2
(45) Date of Patent: Oct. 5, 2021

(54) HIGH EFFICIENCY COMPACT SLOTTED ANTENNA WITH A GROUND PLANE

(71) Applicant: 3D Glass Solutions, Inc., Albuquerque, NM (US)

(72) Inventors: Jeb H. Flemming, Albuquerque, NM (US); Jeff A. Bullington, Orlando, FL (US)

(73) Assignee: 3D Glass Solutions, Inc., Albuquerque, NM (US)

( * ) Notice: Subject to any disclaimer, the term of this patent is extended or adjusted under 35 U.S.C. 154(b) by 0 days.

(21) Appl. No.: 17/274,658

(22) PCT Filed: Sep. 11, 2019

(86) PCT No.: PCT/US2019/050644
§ 371 (c)(1),
(2) Date: Mar. 9, 2021

(87) PCT Pub. No.: WO2020/060824
PCT Pub. Date: Mar. 26, 2020

(65) Prior Publication Data
US 2021/0257741 A1    Aug. 19, 2021

Related U.S. Application Data

(60) Provisional application No. 62/732,472, filed on Sep. 17, 2018.

(51) Int. Cl.
*H01Q 13/22* (2006.01)
*H01Q 21/00* (2006.01)
*H01P 11/00* (2006.01)

(52) U.S. Cl.
CPC ............. *H01Q 13/22* (2013.01); *H01P 11/002* (2013.01); *H01Q 21/0043* (2013.01); *H01Q 21/0087* (2013.01); *Y10T 29/49016* (2015.01)

(58) Field of Classification Search
CPC ............... H01Q 13/22; H01Q 21/0043; H01Q 21/0087; H01P 11/002
See application file for complete search history.

(56) References Cited

U.S. PATENT DOCUMENTS

| | | | |
|---|---|---|---|
| 2,515,940 | A | 7/1950 | Stookey |
| 2,515,941 | A | 7/1950 | Stookey |

(Continued)

FOREIGN PATENT DOCUMENTS

| | | |
|---|---|---|
| AL | 0507719 A1 | 10/1992 |
| CN | 1562831 A | 4/2004 |

(Continued)

OTHER PUBLICATIONS

Grine, F et al., "High-Q Substrate Integrated Waveguide Resonator Filter With Dielectric Loading," IEEE Access vol. 5, Jul. 12, 2017, pp. 12526-12532.

(Continued)

*Primary Examiner* — Daniel Munoz
(74) *Attorney, Agent, or Firm* — Edwin S. Flores; Chalker Flores, LLP

(57) ABSTRACT

The present invention includes a method of making a slotted waveguide antenna structure with a matched ground plane comprising: forming in a photosensitive glass substrate a coaxial-to-coplanar waveguide (CPW) section connected to a power divider, an emission cavity area for the slotted antenna and one or more vias; depositing a metal ground plane to a first surface of the photosensitive glass substrate; depositing a copper layer on the photosensitive glass substrate with a pattern of slots that form a slot antenna above the emission cavity; forming one or more glass pillars in the emission cavity under the slot antenna; etching away the photosensitive glass in the emission cavity while retaining the one or more glass pillars; connecting a micro coaxial connector to the coaxial-to-coplanar waveguide (CPW) sec- (Continued)

tion; and one or more solder bumps at the vias that connect to the ground plane, to form a slotted antenna.

26 Claims, 11 Drawing Sheets

(56) References Cited

U.S. PATENT DOCUMENTS

| | | |
|---|---|---|
| 2,628,160 A | 2/1953 | Stookey |
| 2,684,911 A | 7/1954 | Stookey |
| 2,971,853 A | 2/1961 | Stookey |
| 3,904,991 A | 9/1975 | Ishli et al. |
| 3,985,531 A | 10/1976 | Grossman |
| 3,993,401 A | 11/1976 | Strehlow |
| 4,029,605 A | 6/1977 | Kosiorek |
| 4,131,516 A | 12/1978 | Bakos et al. |
| 4,413,061 A | 11/1983 | Kumar |
| 4,444,616 A | 4/1984 | Fujita et al. |
| 4,514,053 A | 4/1985 | Borelli et al. |
| 4,537,612 A | 8/1985 | Borelli et al. |
| 4,647,940 A | 3/1987 | Traut et al. |
| 4,692,015 A | 9/1987 | Loce et al. |
| 4,788,165 A | 11/1988 | Fong et al. |
| 4,942,076 A | 7/1990 | Panicker et al. |
| 5,078,771 A | 1/1992 | Wu |
| 5,147,740 A | 9/1992 | Robinson |
| 5,212,120 A | 5/1993 | Araujo et al. |
| 5,215,610 A | 6/1993 | Dipaolo et al. |
| 5,371,466 A | 12/1994 | Arakawa et al. |
| 5,374,291 A | 12/1994 | Yabe et al. |
| 5,395,498 A | 3/1995 | Gombinsky et al. |
| 5,409,741 A | 4/1995 | Laude |
| 5,733,370 A | 3/1998 | Chen et al. |
| 5,779,521 A | 7/1998 | Muroyama et al. |
| 5,850,623 A | 12/1998 | Carman, Jr. et al. |
| 5,902,715 A | 5/1999 | Tsukamoto et al. |
| 5,919,607 A | 7/1999 | Lawandy et al. |
| 5,998,224 A | 12/1999 | Rohr et al. |
| 6,066,448 A | 5/2000 | Wohlstadter et al. |
| 6,094,336 A | 7/2000 | Weekamp |
| 6,136,210 A | 10/2000 | Biegelsen et al. |
| 6,171,886 B1 | 1/2001 | Ghosh |
| 6,258,497 B1 | 7/2001 | Kropp et al. |
| 6,287,965 B1 | 9/2001 | Kang et al. |
| 6,329,702 B1 | 12/2001 | Gresham et al. |
| 6,373,369 B2 | 4/2002 | Huang et al. |
| 6,383,566 B1 | 5/2002 | Zagdoun |
| 6,485,690 B1 | 11/2002 | Pfost et al. |
| 6,511,793 B1 | 1/2003 | Cho et al. |
| 6,514,375 B2 | 2/2003 | Kijima |
| 6,562,523 B1 | 2/2003 | Wu et al. |
| 6,678,453 B2 | 1/2004 | Bellman et al. |
| 6,686,824 B1 | 2/2004 | Yamamoto et al. |
| 6,783,920 B2 | 8/2004 | Livingston et al. |
| 6,824,974 B2 | 11/2004 | Pisharody et al. |
| 6,843,902 B1 | 1/2005 | Penner et al. |
| 6,875,544 B1 | 4/2005 | Sweatt et al. |
| 6,932,933 B2 | 8/2005 | Halvajian et al. |
| 6,977,722 B2 | 12/2005 | Wohlstadter et al. |
| 7,033,821 B2 | 4/2006 | Kim et al. |
| 7,132,054 B1 | 11/2006 | Kravitz et al. |
| 7,179,638 B2 | 2/2007 | Anderson |
| 7,277,151 B2 | 10/2007 | Ryu et al. |
| 7,306,689 B2 | 12/2007 | Okubora et al. |
| 7,326,538 B2 | 2/2008 | Pitner et al. |
| 7,407,768 B2 | 8/2008 | Yamazaki et al. |
| 7,410,763 B2 | 8/2008 | Su et al. |
| 7,439,128 B2 | 10/2008 | Divakaruni |
| 7,470,518 B2 | 12/2008 | Chiu et al. |
| 7,497,554 B2 | 3/2009 | Okuno |
| 7,603,772 B2 | 10/2009 | Farnsworth et al. |
| 7,948,342 B2 | 5/2011 | Long |
| 8,062,753 B2 | 11/2011 | Schreder et al. |
| 8,076,162 B2 | 12/2011 | Flemming et al. |
| 8,096,147 B2 | 1/2012 | Flemming et al. |
| 8,361,333 B2 | 1/2013 | Flemming et al. |
| 8,492,315 B2 | 7/2013 | Flemming et al. |
| 8,709,702 B2 | 4/2014 | Flemming et al. |
| 9,385,083 B1 | 7/2016 | Herrault et al. |
| 9,449,753 B2 | 9/2016 | Kim |
| 9,755,305 B2 | 9/2017 | Desclos et al. |
| 9,819,991 B1 | 11/2017 | Rajagopalan et al. |
| 10,070,533 B2 | 9/2018 | Flemming et al. |
| 10,201,901 B2 | 2/2019 | Flemming et al. |
| 2001/0051584 A1 | 12/2001 | Harada et al. |
| 2002/0015546 A1 | 2/2002 | Bhagavatula |
| 2002/0086246 A1 | 7/2002 | Lee |
| 2002/0100608 A1 | 8/2002 | Fushie et al. |
| 2003/0025227 A1 | 2/2003 | Daniell |
| 2003/0124716 A1 | 7/2003 | Hess et al. |
| 2003/0135201 A1 | 7/2003 | Gonnelli |
| 2003/0156819 A1 | 8/2003 | Pruss |
| 2003/0174944 A1 | 9/2003 | Dannoux |
| 2003/0228682 A1 | 12/2003 | Lakowicz et al. |
| 2003/0231830 A1 | 12/2003 | Hikichi |
| 2004/0008391 A1 | 1/2004 | Bowley et al. |
| 2004/0020690 A1 | 2/2004 | Parker et al. |
| 2004/0155748 A1 | 8/2004 | Steingroever |
| 2004/0171076 A1 | 9/2004 | Dejneka et al. |
| 2004/0184705 A1 | 9/2004 | Shimada et al. |
| 2004/0198582 A1 | 10/2004 | Borrelli et al. |
| 2004/0227596 A1 | 11/2004 | Nguyen et al. |
| 2005/0089901 A1 | 4/2005 | Porter et al. |
| 2005/0105860 A1 | 5/2005 | Oono |
| 2005/0150683 A1 | 7/2005 | Farnworth et al. |
| 2005/0170670 A1 | 8/2005 | King et al. |
| 2005/0277550 A1 | 12/2005 | Brown et al. |
| 2006/0092079 A1 | 5/2006 | Rochemont |
| 2006/0118965 A1 | 6/2006 | Matsui |
| 2006/0147344 A1 | 7/2006 | Ahn et al. |
| 2006/0158300 A1 | 7/2006 | Korony et al. |
| 2006/0159916 A1 | 7/2006 | Dubrow et al. |
| 2006/0171033 A1 | 8/2006 | Shreder et al. |
| 2006/0177855 A1 | 8/2006 | Utermohlen et al. |
| 2006/0188907 A1 | 8/2006 | Lee et al. |
| 2006/0193214 A1 | 8/2006 | Shinano et al. |
| 2006/0283948 A1 | 12/2006 | Naito |
| 2007/0120263 A1 | 5/2007 | Gabric et al. |
| 2007/0121263 A1 | 5/2007 | Liu et al. |
| 2007/0155021 A1 | 7/2007 | Zhang et al. |
| 2007/0158787 A1 | 7/2007 | Chanchani |
| 2007/0248126 A1 | 10/2007 | Liu |
| 2007/0267708 A1 | 11/2007 | Courcimault |
| 2007/0272829 A1 | 11/2007 | Nakagawa et al. |
| 2007/0279837 A1 | 12/2007 | Chow et al. |
| 2007/0296520 A1 | 12/2007 | Hosokawa et al. |
| 2008/0136572 A1 | 6/2008 | Ayasi et al. |
| 2008/0174976 A1 | 7/2008 | Satoh et al. |
| 2008/0182079 A1 | 7/2008 | Mirkin et al. |
| 2008/0223603 A1 | 9/2008 | Kim et al. |
| 2008/0226228 A1 | 9/2008 | Tamura |
| 2008/0245109 A1 | 10/2008 | Flemming et al. |
| 2008/0291442 A1 | 11/2008 | Lawandy |
| 2008/0305268 A1 | 12/2008 | Norman et al. |
| 2008/0316678 A1 | 12/2008 | Ehrenberg et al. |
| 2009/0029185 A1 | 1/2009 | Lee et al. |
| 2009/0075478 A1 | 3/2009 | Matsui |
| 2009/0130736 A1 | 5/2009 | Collis et al. |
| 2009/0170032 A1 | 7/2009 | Takahashi et al. |
| 2009/0182720 A1 | 7/2009 | Cain et al. |
| 2009/0243783 A1 | 10/2009 | Fouquet et al. |
| 2010/0022416 A1 | 1/2010 | Flemming et al. |
| 2010/0059265 A1 | 3/2010 | Myung-Soo |
| 2010/0237462 A1 | 9/2010 | Beker et al. |
| 2011/0003422 A1 | 1/2011 | Katragadda et al. |
| 2011/0045284 A1 | 2/2011 | Matsukawa et al. |
| 2011/0065662 A1 | 3/2011 | Rinsch et al. |
| 2011/0108525 A1 | 5/2011 | Chien et al. |
| 2011/0170273 A1 | 7/2011 | Helvajian |
| 2011/0195360 A1 | 8/2011 | Flemming et al. |
| 2011/0217657 A1 | 9/2011 | Flemming et al. |
| 2011/0284725 A1 | 11/2011 | Goldberg |
| 2011/0304999 A1 | 12/2011 | Yu et al. |
| 2012/0080612 A1 | 4/2012 | Grego |

(56) References Cited

U.S. PATENT DOCUMENTS

| | | |
|---|---|---|
| 2012/0161330 A1 | 6/2012 | Hlad et al. |
| 2013/0119401 A1 | 5/2013 | D'Evelyn et al. |
| 2013/0142998 A1 | 6/2013 | Flemming et al. |
| 2013/0183805 A1 | 7/2013 | Ibm |
| 2013/0233202 A1 | 9/2013 | Cao et al. |
| 2013/0278568 A1 | 10/2013 | Lasiter et al. |
| 2013/0337604 A1 | 12/2013 | Ozawa et al. |
| 2014/0002906 A1 | 1/2014 | Shibuya |
| 2014/0035540 A1 | 2/2014 | Ehrenberg |
| 2014/0035892 A1 | 2/2014 | Shenoy |
| 2014/0035935 A1 | 2/2014 | 5Henoy et al. |
| 2014/0070380 A1 | 3/2014 | Chiu et al. |
| 2014/0104284 A1 | 4/2014 | Shenoy et al. |
| 2014/0144681 A1 | 5/2014 | Pushparaj et al. |
| 2014/0145326 A1 | 5/2014 | Lin et al. |
| 2014/0169746 A1 | 6/2014 | Hung et al. |
| 2014/0203891 A1 | 7/2014 | Yazaki |
| 2014/0247269 A1 | 9/2014 | Berdy et al. |
| 2014/0272688 A1 | 9/2014 | Dillion |
| 2014/0367695 A1 | 12/2014 | Barlow |
| 2015/0048901 A1 | 2/2015 | Rogers |
| 2015/0071593 A1 | 3/2015 | Kanke |
| 2015/0210074 A1 | 7/2015 | Chen et al. |
| 2015/0263429 A1 | 9/2015 | Vahidpour et al. |
| 2015/0277047 A1 | 10/2015 | Flemming et al. |
| 2016/0048079 A1 | 2/2016 | Lee et al. |
| 2016/0181211 A1 | 6/2016 | Kamgaing et al. |
| 2016/0254579 A1 | 9/2016 | Mills |
| 2016/0265974 A1 | 9/2016 | Erte et al. |
| 2016/0268665 A1* | 9/2016 | Sherrer .................. H01P 3/06 |
| 2016/0320568 A1 | 11/2016 | Haase |
| 2016/0380614 A1 | 12/2016 | Abbott et al. |
| 2017/0003421 A1 | 1/2017 | Flemming et al. |
| 2017/0077892 A1 | 3/2017 | Thorup |
| 2017/0094794 A1 | 3/2017 | Flemming et al. |
| 2017/0098501 A1 | 4/2017 | Flemming et al. |
| 2017/0213762 A1 | 7/2017 | Gouk |
| 2018/0323485 A1 | 11/2018 | Gnanou et al. |
| 2019/0280079 A1 | 7/2019 | Bouvier et al. |
| 2020/0275558 A1 | 8/2020 | Fujita |

FOREIGN PATENT DOCUMENTS

| | | |
|---|---|---|
| CN | 105938928 | 9/2016 |
| CN | 210668058 U | 6/2020 |
| DE | 102004059252 A1 | 1/2006 |
| EP | 0311274 A1 | 12/1989 |
| EP | 0685857 B1 | 12/1995 |
| EP | 0949648 A1 | 10/1999 |
| EP | 1683571 A1 | 6/2006 |
| JP | 08179155 | 6/1905 |
| JP | 56-15587 | 12/1981 |
| JP | 61231529 A | 10/1986 |
| JP | 63-128699 A | 6/1988 |
| JP | H393683 A | 4/1991 |
| JP | 05139787 A | 6/1993 |
| JP | 10007435 A | 1/1998 |
| JP | 10199728 A | 7/1998 |
| JP | 11344648 A | 12/1999 |
| JP | 2000228615 A | 8/2000 |
| JP | 2001033664 A | 2/2001 |
| JP | 2001206735 A | 7/2001 |
| JP | 2005302987 A | 10/2005 |
| JP | 2005215644 A | 11/2005 |
| JP | 2006179564 A | 6/2006 |
| JP | 2008252797 A | 10/2008 |
| JP | 2012079960 A | 4/2012 |
| JP | 2013062473 A | 4/2013 |
| JP | 2013217989 A | 10/2013 |
| JP | 2014241365 A | 12/2014 |
| JP | 2015028651 A | 2/2015 |
| JP | H08026767 A | 1/2016 |
| JP | 2018200912 A | 12/2018 |
| KR | 100941691 B1 | 2/2010 |
| KR | 101167691 B1 | 7/2012 |
| WO | 2007088058 A1 | 8/2007 |
| WO | 2008119080 A1 | 10/2008 |
| WO | 2008154931 A1 | 12/2008 |
| WO | 2009029733 A2 | 3/2009 |
| WO | 2009062011 A1 | 5/2009 |
| WO | 2009126649 A2 | 10/2009 |
| WO | 2010011939 A2 | 1/2010 |
| WO | 2011100445 A1 | 8/2011 |
| WO | 2011109648 A1 | 9/2011 |
| WO | 2012078213 A1 | 6/2012 |
| WO | 2014062226 A1 | 1/2014 |
| WO | 2014043267 A1 | 3/2014 |
| WO | 2014062311 A1 | 4/2014 |
| WO | 2015108648 A1 | 7/2015 |
| WO | 2015112903 A1 | 7/2015 |
| WO | 2015171597 A1 | 11/2015 |
| WO | 2017132280 A2 | 8/2017 |
| WO | 2017147511 A1 | 8/2017 |
| WO | 2017177171 A1 | 10/2017 |
| WO | 2018200804 A1 | 1/2018 |
| WO | 2019010045 A1 | 1/2019 |
| WO | 2019118761 A1 | 6/2019 |
| WO | 2019136024 A1 | 7/2019 |
| WO | 2019199470 A1 | 10/2019 |
| WO | 2019231947 A1 | 12/2019 |
| WO | 2020060824 A1 | 3/2020 |
| WO | 2020139951 A1 | 7/2020 |
| WO | 2020139955 A1 | 7/2020 |

OTHER PUBLICATIONS

Hyeon, I-J, et al., "Millimeter-Wave Substrate Integrated Waveguide Using Micromachined Tungsten-Coated Through Glass Silicon Via Structures," Micromachines, vol. 9, 172 Apr. 9, 2018, 9 pp.

International Search Report and Written Opinion for PCT/US2020/026673 dated Jun. 22, 2020, by the USPTO, 13 pp.

International Search Report and Written Opinion for PCT/US2020/28474 dated Jul. 17, 2020 by the USPTO, 7 pp.

Mohamedelhassan, A., "Fabrication of Ridge Waveguides in Lithium Niobate," Independent thesis Advanced level, KTH, School of Engineering Sciences, Physics, 2012, 68 pp.

Muharram, B., Thesis from University of Calgary Graduate Studies, "Substrate-Integrated Waveguide Based Antenna in Remote Respiratory Sensing," 2012, 97 pp.

European Search Report and Supplemental European Search Report for EP 18889385.3 dated Dec. 2, 2020, 8 pp.

International Search Report and Written Opinion for PCT/US2020/54394 dated Jan. 7, 2021 by the USPTO, 15 pp.

Green, S., "Heterogeneous Integration of DARPA: Pathfinding and Progress in Assembly Approaches," viewed on and retrieved from the Internet on Feb. 26, 2021, <URL:https://web.archive.org/web/20181008153224/https://www.ectc.net/files/68/Demmin%20Darpa.pdf>, published Oct. 8, 2018 per the Wayback Machine.

Aslan, et al, "Metal-Enhanced Fluorescence: an emerging tool in biotechnology" Current opinion in Biotechnology (2005), 16:55-62.

Azad, I., et al., "Design and Performance Analysis of 2.45 GHz Microwave Bandpass Filter with Reduced Harmonics," International Journal of Engineering Research and Development (2013), 5(11):57-67.

Bakir, Muhannad S., et al., "Revolutionary Nanosilicon Ancillary Technologies for Ultimate-Performance Gigascale Systems," IEEE 2007 Custom Integrated Circuits Conference (CICC), 2007, pp. 421-428.

Beke, S., et al., "Fabrication of Transparent and Conductive Microdevices," Journal of Laser Micro/Nanoengineering (2012), 7(1):28-32.

Brusberg, et al. "Thin Glass Based Packaging Technologies for Optoelectronic Modules" Electronic Components and Technology Conference, May 26-29, 2009, pp. 207-212, DOI:10.1109/ECTC.2009.5074018, pp. 208-211; Figures 3, 8.

Cheng, et al. "Three-dimensional Femtosecond Laser Integration in Glasses" The Review of Laser Engineering, vol. 36, 2008, pp. 1206-1209, Section 2, Subsection 3.1.

(56) References Cited

OTHER PUBLICATIONS

Chowdhury, et al, "Metal-Enhanced Chemiluminescence", J Fluorescence (2006), 16:295-299.
Crawford, Gregory P., "Flexible Flat Panel Display Technology," John Wiley and Sons, NY, (2005), 9 pages.
Dang, et al. "Integrated thermal-fluidic I/O interconnects for an on-chip microchannel heat sink," IEEE Electron Device Letters, vol. 27, No. 2, pp. 117-119, 2006.
Dietrich, T.R., et al., "Fabrication Technologies for Microsystems Utilizing Photoetchable Glass," Microelectronic Engineering 30, (1996), pp. 407-504.
Extended European Search Report 15741032.5 dated Aug. 4, 2017, 11 pp.
Extended European Search Report 15789595.4 dated Mar. 31, 2017, 7 pp.
Extended European Search Report 17744848.7 dated Oct. 30, 2019, 9 pp.
Extended European Search Report 17757365.6 dated Oct. 14, 2019, 14 pp.
Geddes, et al, "Metal-Enhanced Fluorescence" J Fluorescence, (2002), 12:121-129.
Gomez-Morilla, et al. "Micropatterning of Foturan photosensitive glass following exposure to MeV proton beams" Journal of Micromechanics and Microengineering, vol. 15, 2005, pp. 706-709, DOI:10.1088/0960-1317/15/4/006.
Intel Corporation, "Intel® 82566 Layout Checklist (version 1.0)", 2006.
International Search Report and Written Opinion for PCT/US2008/058783 dated Jul. 1, 2008, 15 pp.
International Search Report and Written Opinion for PCT/US2008/074699 dated Feb. 26, 2009, 11 pp.
International Search Report and Written Opinion for PCT/US2009/039807 dated Nov. 24, 2009, 13 pp.
International Search Report and Written Opinion for PCT/US2009/051711 dated Mar. 5, 2010, 15 pp.
International Search Report and Written Opinion for PCT/US2011/024369 dated Mar. 25, 2011, 13 pp.
International Search Report and Written Opinion for PCT/US2013/059305 dated Jan. 10, 2014, 6 pp.
International Search Report and Written Opinion for PCT/US2015/012758 dated Apr. 8, 2015, 11 pp.
International Search Report and Written Opinion for PCT/US2015/029222 dated Jul. 22, 2015, 9 pp.
International Search Report and Written Opinion for PCT/US2017/019483 dated May 19, 2017, 11 pp.
International Search Report and Written Opinion for PCT/US2017/026662 dated Jun. 5, 2017, 11 pp.
International Search Report and Written Opinion for PCT/US2018/029559 dated Aug. 3, 2018, 9 pp.
International Search Report and Written Opinion for PCT/US2018/039841 dated Sep. 20, 2018 by Australian Patent Office, 12 pp.
International Search Report and Written Opinion for PCT/US2018/065520 dated Mar. 20, 2019 by Australian Patent Office, 11 pp.
International Search Report and Written Opinion for PCT/US2018/068184 dated Mar. 19, 2019 by Australian Patent Office, 11 pp.
International Search Report and Written Opinion for PCT/US2019/024496 dated Jun. 20, 2019 by Australian Patent Office, 9 pp.
International Search Report and Written Opinion for PCT/US2019/34245 dated Aug. 9, 2019 by Australian Patent Office, 10 pp.
International Search Report and Written Opinion for PCT/US2019/50644 dated Dec. 4, 2019 by USPTO, 9 pp.
International Technology Roadmap for Semiconductors, 2007 Edition, "Assembly and Packaging," 9 pages.
Kamagaing, et al., "Investigation of a photodefinable glass substrate for millimeter-wave radios on package," Proceeds of the 2014 IEEE 64th Electronic Components and Technology Conference, May 27, 2014, pp. 1610-1615.
Lakowicz, et al; "Advances in Surface-Enhanced Fluorescence", J Fluorescence, (2004), 14:425-441.
Lewis, Sr., "Hawley's Condensed Chemical Dictionary." 13th ed, 1997, John Wiley and Sons. p. 231.
Lin, C.H. et al., "Fabrication of Microlens Arrays in Photosensitive Glass by Femtosecond Laser Direct Writing," Appl Phys A (2009) 97:751-757.
Livingston, F.E., et al., "Effect of Laser Parameters on the Exposure and Selective Etch Rate in Photostructurable Glass," SPIE vol. 4637 (2002); pp. 404-412.
Lyon, L.A., et al., "Raman Spectroscopy," Anal Chem (1998), 70:341R-361R.
Papapolymerou, I., et al., "Micromachined patch antennas," IEEE Transactions on Antennas and Propagation, vol. 46, No. 2, 1998, pp. 275-283.
Perro, A., et al., "Design and synthesis of Janus micro- and nanoparticles," J Mater Chem (2005), 15:3745-3760.
Quantum Leap, "Liquid Crystal Polymer (LCP) LDMOS Packages," Quantum Leap Datasheet, (2004), mlconnelly.com/QLPKG.Final_LDMOS_DataSheet.pdf, 2 pages.
Scrantom, Charles Q., "LTCC Technology—Where we are and Where we're Going—IV," Jun. 2000, 12 pages.
TechNote #104, Bangs Laboratories, www.bangslabs.com/technotes/104.pdf, "Silica Microspheres".
TechNote #201, Bangs Laboratories, www.bangslabs.com/technotes/201.pdf, "Working with Microspheres".
TechNote #205, Bangs Laboratories, www.bangslabs.com/technotes/205.pdf, "Covalent Coupling".
Wang, et al. "Optical waveguide fabrication and integration with a micro-mirror inside photosensitive glass by femtosecond laser direct writing" Applied Physics A, vol. 88, 2007, pp. 699-704, DOI:10.1007/S00339-007-4030-9.
Zhang, H., et al., "Biofunctionalized Nanoarrays of Inorganic Structures Prepared by Dip-Pen Nanolithography," Nanotechnology (2003), 14:1113-1117.
Zhang, H., et al., Synthesis of Hierarchically Porous Silica and Metal Oxide Beads Using Emulsion-Templated Polymer Scaffolds, Chem Mater (2004), 16:4245-4256.
Chou, et al., "Design and Demonstration of Micro-mirrors and Lenses for Low Loss and Low Cost Single-Mode Fiber Coupling in 3D Glass Photonic Interposers," 2016 IEEE 66th Electronic Components and Technology Conference, May 31-Jun. 3, 7 pp.
European Search Report and Supplemental European Search Report for EP 18828907 dated Mar. 25, 2020, 11 pp.
International Search Report and Written Opinion for PCT/US2019/068586 dated Mar. 12, 2020 by USPTO, 10 pp.
International Search Report and Written Opinion for PCT/US2019/068590 dated Mar. 5, 2020 by USPTO, 9 pp.
International Search Report and Written Opinion for PCT/US2019/068593 dated Mar. 16, 2020 by USPTO, 8 pp.
Topper, et al., "Development of a high density glass interposer based on wafer level packaging technologies," 2014 IEEE 64th Electronic Components and Technology Conference, May 27, 2014, pp. 1498-1503.
International Search Report and Written Opinion for PCT/US2021/21371 dated May 20, 2021 by the USPTO, 10 pp.
European Search Report and Supplemental European Search Report for EP 19784673.6 dated Feb. 2, 2021, 8 pp.
European Search Report and Supplemental European Search Report for EP 19811031.4 dated Feb. 26, 2021, 7 pp.
International Search Report and Written Opinion for PCT/US2021/27499 dated Jun. 16, 2021 by the USPTO, 7 pp.

\* cited by examiner

HIGH EFFICIENCY COMPACT SLOTTED ANTENNA WITH A GROUND PLANE

CROSS-REFERENCE TO RELATED APPLICATIONS

This application is the National Stage of International Application No. PCT/US2019/050644, filed on 11 Sep. 2019 claiming the priority to U.S. Provisional Application No. 62/732,472 filed on 17 Sep. 2018, the contents of each of which are incorporated by reference herein.

TECHNICAL FIELD OF THE INVENTION

The present invention relates to methods of making a high efficiency compact slotted antenna with an ground plane from one or two photodefinable glass substrate wafers.

BACKGROUND OF THE INVENTION

Without limiting the scope of the invention, its background is described in connection with high efficiency compact slotted antenna.

A slot antenna consists of a metal surface, usually a flat plate, with one or more holes or slots cut out of a metal substrate/ground plane. In general, these slots are about are about $\lambda/4$ long with a centers to center spacing of $\lambda/2$ separation. The emitter or source is generally placed $\lambda/4$ from the first slot and the center of the last slot is $\lambda/4$ from the end or reflector of the waveguide. The reflector or end of waveguide requires a precision of $\sim\lambda/10$. A one-centimeter wavelength requires a reflector placement precision of one millimeter. The widths of the slots are much less than the wavelength of the emission. The shape and size of the slot, as well as the driving frequency, determine the radiation pattern. Slot antennas are widely used in radar antennas in marine radar, cell phone base stations, and desktop microwave sources for research and calibration purposes. FIG. 4 shows two commercial versions of a slot antenna. A slot antenna's main advantages are its design simplicity and convenient adaptation to mass production for frequencies between 1 GHz and 25 GHz. The most common slotted waveguide resembles that shown in FIG. 1. FIG. 1 shows the center-to-center spacing of slots is $\lambda/2$, the termination of the waveguide is $\lambda/4$ from the center of the last slot with a precision of $\lambda/10$, the width of the slots are $<<\lambda$. The width of the waveguide is approximately the free space wavelength ($\lambda$) of the emission and the height of the waveguide is $\lambda/10$. You can see that at 1 GHz or wavelength of 29.9 cm up to a frequency of 25 GHz or wavelength of 1.19 cm classic computer numerical control (CNC) tools have sufficient precision to create slotted. However at 100 GHz or wavelength of 0.299 cm requires a transverse slot dimension $<<\lambda$ on the order of 0.003 cm (1.1 mil). A modern CNC tool has a precision of 0.01 cm+/−0.01 cm or ~3.9 mil+/−0.4 mil. Clearly at higher frequencies or shorter wavelengths the ability to use classical CNC machining becomes unrealizable.

SUMMARY OF THE INVENTION

Slotted antenna are consider simple to fabricate using classic machining techniques at frequencies between 600 MHz and 25 GHz. Above 30 GHz the precision and feature size for making the slots, waveguides, and frequency launching elements. As an example, the center-to-center spacing at a frequency of 100 GHz is 212 or 1.5 mm, the termination of the waveguide is $\lambda/4$ or 750 μm from the center of the last slot with a precision of $\lambda/10$ or 150 μm, the width of the slots are $<<\lambda$ or 150 μm, the width of the waveguide is approximately the free space wavelength ($\lambda$ or 3 mm) of the emission and the height of the waveguide is $\lambda/10$ or 150 μm. The level of precision required for slot antenna exceeds classic CNC machining capability to produce low cost high quality slotted antenna. However printed circuit board (PCB) and/or semiconductor processing technology the ability to produce feature sizes much less than a micrometer. The materials used in PCB and semiconductor technology are electronically lossy i.e; they have a high loss tangent and not support the creation or production of an efficient low cost slot antenna. DuPont has shown the use of a LTCC (low temperature co-fired ceramic) multilayer slotted antenna. The LTCC antenna was prototyped by etching pattern green (unfired/sintered) ceramic and then filling the pattern with a refractory metal. The cavity of the antenna consisted of the ceramic material. The individual layers of the green LTCC were then hand assembled much like a deck of cards and then sintered/fired to form a slotted antenna. The green ceramic shrinks about 8.5% in the plane direction of the ceramic when fired/sintered. The shrinkage causes stress and misalignment of the individual elements of the slotted antenna. This LTCC slotted antenna had reasonable performance but was determined not to be cost effective. The RF properties for LTCC include a loss tangent of 0.0012 and a dielectric constant of 7.1+/−0.2. Several of the devices were prototyped and tested. These values for the loss tangent and dielectric constant are good compared to other efforts to make a miniature slotted antenna but they fall into the poor category when compared to large slotted antennas that have air as the dielectric media. Air has a loss tangent of 0.00 and a dielectric constant of 1.00059. Unfortunately, the yield and performance of the ceramic prevented the LTCC slotted antenna technology form being viable. Classic MEMS based processing is not able to produce a viable technical approach due to the inherent stress from the thick deposition in the materials that are added or subtracted. Thin films have stress building up from the deposition process that is sufficient to cause a delamination in thicker device structures. The present invention is a photodefinable glass based slotted antenna that uses air as its dielectric media using semiconductor/printed circuit board (PCB) processing in a photodefinable glass and low stress electroplating metallization technology.

In one embodiment, the present invention includes a method of making a slotted waveguide antenna structure with matched ground plane comprising: forming in a photosensitive glass substrate a coaxial-to-coplanar waveguide (CPW) section connected to a power divider that is connected to an emission cavity area for the slotted antenna and one or more vias; depositing a metal ground plane to a first surface of the photosensitive glass substrate; depositing a copper layer on the photosensitive glass substrate with a pattern of slots that form a slot antenna above the emission cavity; forming one or more copper pillars in the emission cavity under the slot antenna; etching away the photosensitive glass in the emission cavity while retaining the one or more copper pillars; connecting a micro coaxial connector to the coaxial-to-coplanar waveguide (CPW) section; and one or more solder bumps at the vias that connect to the ground plane, to form a slotted antenna. In one aspect, the photodefinable glass substrate is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$. In another aspect, the photodefinable glass substrate is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$. In another aspect, the photodefinable glass substrate is at least one of: a photo-definable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1. In another aspect, the photodefinable glass substrate is a photosensitive glass ceramic composite substrate comprising at least one of silica, lithium oxide, aluminum oxide, or cerium oxide. In another aspect, the method further comprises dicing one or more of the slotted antennas from the photodefinable glass substrate into individual slotted antennas. In another aspect, the slotted antenna comprises one or more slot openings above a cavity, wherein the slotted portion of the antenna is supported with one or more glass or copper pillars in the cavity.

In another embodiment, the present invention includes a two-wafer method of making a slotted antenna comprising: forming on a first surface of a first photodefinable glass substrate wafer: one or more copper support pillars in a cavity, one or more outside walls for the cavity, and a copper via for connecting a micro axial connector, and on a second surface of a first photodefinable glass substrate wafer a copper layer that comprises one or more antenna slots; forming on a first surface of a second photodefinable glass substrate wafer: a micro axial connector and power divider section, a resonator cavity, side walls, and one or more support structures in the resonator cavity; and placing solder balls along a metal surface of an emission cavity slotted antenna section, the support structures in the cavity, a power divider section, and a coaxial-to-coplanar waveguide (CPW) of at least one of the first or second photodefinable glass substrate wafers; aligning the first and second photodefinable glass substrate wafers at the slotted antenna; and compressing the first or second photodefinable glass substrate wafers at a temperature sufficient to flow the solder balls to connect the support structures in the cavity, a power divider section, and a coaxial-to-coplanar waveguide of the first and second photodefinable glass substrate wafers; and forming a slotted antenna on a surface of the second photodefinable glass substrate wafer opposite the cavity in the first photodefinable glass substrate wafer. In one aspect, the photodefinable glass substrate is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$. In another aspect, the photodefinable glass substrate is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$. In another aspect, the photodefinable glass substrate is at least one of: a photo-definable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1. In another aspect, the photodefinable glass substrate is a photosensitive glass ceramic composite substrate comprising at least one of silica, lithium oxide, aluminum oxide, or cerium oxide. In another aspect, the method further comprises dicing one or more of the slotted antennas from the photodefinable glass substrate into individual slotted antennas. In another aspect, the slotted antenna comprises one or more slot openings above a cavity, wherein the slotted portion of the antenna is supported with one or more glass or copper pillars in the cavity.

In yet another embodiment, the present invention includes a method of making a slotted waveguide antenna structure with matched ground plane comprising: (1) masking a design layout comprising one or more structures to form one or more electrical conduction paths on a photodefinable glass substrate; (2) exposing at least one portion of the photosensitive glass substrate to an activating energy source to expose one or more sidewalls and one or more support elements of an antenna structure; (3) processing the photosensitive glass substrate to a heating phase above its glass transition temperature to convert a portion of the photodefinable glass substrate exposed the activating energy source into a ceramic, wherein the portion of the photodefinable glass formed into a ceramic comprises an outside, inside walls, and at least one via of the antenna structure; (4) depositing a layer of tantalum and a layer of copper on a first side of the photodefinable glass substrate; (5) coating the photodefinable glass substrate with a photoresist to form an interior of a coaxial-to-coplanar waveguide (CPW) connected to a power divider that is connected to an emission cavity for the slotted antenna; (6) etching one or more sidewalls and one or more support vias in the substrate; (7) depositing a photoresist the protects the coaxial-to-coplanar waveguide (CPW) and the power divider; (8) exposing the photosensitive glass substrate to an activating energy source to expose the emission cavity for a time sufficient to form the cavity without crossing the wafer; (9) removing the photoresist and processing the photosensitive glass substrate to a heating phase above its glass transition temperature to convert the photodefinable glass substrate exposed to the activating energy source into a ceramic; (10) coating and exposing a photoresist on a second side of the photodefinable glass substrate with a pattern of slots that form a slot antenna; (11) depositing a layer of tantalum and a layer of copper on the second side of the photodefinable glass substrate; (12) removing the photoresist and electroplating with copper the photodefinable glass substrate; (13) coating the photodefinable glass substrate with a photoresist except for the portion of the emission cavity, and exposing the power divider and coaxial to CPW sections; (14) etching a portion of the photodefinable glass substrate formed into a ceramic for a time sufficient to form the emission cavity, without traversing the photodefinable glass substrate; (15) rinsing the wafer with water or a solvent; (16) using a projection aligner exposing a region with a pattern to form one or more glass pillars or glass pillar regions in the emission cavity; (17) coating the photodefinable glass substrate to silver nitrate and reducing the silver nitrate to metallic silver on the photodefinable glass substrate with an infrared source on the power divider and coaxial to CPW sections; (18) electroless plating copper on the metallic silver; (19) heating the photodefinable glass substrate to at least 250° C. in argon to adhere the copper to the silver; (20) etching with a spin on glass $SiO_2$ with a plasma etching process to expose the copper sidewalls around the power divider and coaxial to CPW sections; (21) plasma etching down to one or more copper sidewalls; (22) coating the photodefinable glass substrate with photoresist and open the region over the spin on glass over where a contact tab for the power divider and coaxial to CPW sections and plasma etching down to a copper tab; (23) removing the photoresist using a standard stripper the rinse with water; (24) coating the photodefinable glass substrate with a photoresist clearing a pattern over the power divider; (25) sputtering coating the photodefinable glass substrate with tantalum and then copper; (26) electroless plating copper on the sputtered copper; (27) removing the photoresist and rinsing the photodefinable glass substrate with water; (28) depositing a solder bump with an ink jet printer to form an electrical contact with a center electrode of a micro coaxial connector of the coaxial to CPW element; (29) heating the photodefinable glass substrate to allow the solder bump to flow making a solid electrical and mechanical connection from the electrical contact of the coaxial to CPW element; (30) rinsing the wafer in 10% HF, to remove all of the remain ceramic material and spin on glass from the antenna cavity; (31) rinsing the wafer with water and alcohol; and (32) depositing a solder bump bond with an ink jet deposition process at a perimeter of the slotted antenna to make contact with a ground plane and to attach the micro coaxial connector to the photodefinable glass substrate; and at the center electrode of the micro coaxial connector to the coax to CPW element; (33) attaching a surface mount micro coaxial connector to the solder bumps, to provide a coaxial connector to the slotted antenna. In one aspect, the activating energy source is a UV light. In another aspect, the photodefinable glass substrate is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$. In another aspect, the photodefinable glass substrate is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$. In another aspect, the photodefinable glass substrate is at least one of: a photo-definable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1. In another aspect, the photodefinable glass substrate wafer is a photosensitive glass ceramic composite substrate comprising at least one of silica, lithium oxide, aluminum oxide, or cerium oxide. In another aspect, the method further comprises dicing one or more of the slotted antennas from the first and second photodefinable glass substrate wafers into individual slotted antennas. In another aspect, the slotted antenna comprises one or more slot openings above a cavity, wherein the slotted portion of the antenna is supported with one or more glass or copper pillars in the cavity formed between the first and second photodefinable glass substrate wafers.

In yet another embodiment, the present invention includes a two-wafer method of making a slotted antenna comprising: (1) processing a first photodefinable glass substrate wafer by: depositing a photoresist or wax on a first surface of a first photodefinable glass substrate wafer; exposing a pattern on the first photodefinable glass substrate wafer to expose one or more sides of an emission cavity, one or more vias, and one or more support structures of an antenna structure; thermally cycling the first photodefinable glass substrate wafer to convert the exposed material to a ceramic; coating, exposing and developing a photoresist on the first side of the first photodefinable glass substrate wafer into slots for RF emissions; depositing tantalum and copper on the photoresist by sputtering on the first surface of the first photodefinable glass substrate wafer; electroplating copper on the first photodefinable glass substrate wafer; coating the first surface of the first photodefinable glass substrate wafer with a wax, a photoresist or other protective coating; etching the one or more vias and the one or more support structures; electroplating the one or more vias and the one or more support structures and the one or more sidewalls of the antenna; performing chemical-mechanical polishing of a second surface of the first photodefinable glass substrate wafer opposite the first surface of the first photodefinable glass substrate wafer; exposing the emission cavity to an activating energy to expose the emission cavity, a power divider and a coaxial-to-coplanar waveguide (CPW) section; thermally cycling the first photodefinable glass substrate wafer to convert the exposed material to a ceramic phase; (2) processing a second photodefinable glass substrate wafer by: forming on a first surface of the second photodefinable glass substrate wafer a micro coaxial connector and power divider section with a photo mask; exposing one or more sidewalls of an emission cavity, and one or more support structures; thermally cycle the second photodefinable glass substrate wafer to convert the exposed material to a ceramic phase; coating, exposing and developing a photoresist on a second surface of the second photodefinable glass substrate wafer substrate with a pattern for an external copper slotted antenna; depositing tantalum and copper on the photoresist by sputtering on the first surface of the second photodefinable glass substrate wafer; removing the photoresist using a standard stripper and electroplating copper on the second photodefinable glass substrate wafer; coating a second surface of the second photodefinable glass substrate wafer with a wax, a photoresist or other protective coating; etching the one or more sidewalls and one or more support pillars; electroplating the one or more pillars and one or more sidewalls from the copper on the first surface of the second photodefinable glass substrate wafer; rinsing with water and drying the second photodefinable glass substrate wafer; flattening a second surface of the second photodefinable glass substrate wafer my chemical-mechanical polishing; coating, exposing and developing a photoresist on the first surface of the second photodefinable glass substrate wafer to shield the micro coaxial connector power divider section; exposing the second photodefinable glass substrate wafer to an activating energy; thermally cycling the second photodefinable glass substrate wafer to convert the exposed material to a ceramic phase; depositing tantalum and copper on the photoresist by sputtering on the first surface of the second photodefinable glass substrate wafer; removing the photoresist using a standard stripper and electroplating copper on the second photodefinable glass substrate wafer to expose the openings; and (3) connecting the first and second photodefinable glass substrate wafers, by: placing solder balls on the copper elements of the front surface of the first photodefinable glass substrate wafer; using alignment fiducials and etched keyed structure to align the first and second photodefinable glass substrate wafers; compressing the first and second photodefinable glass substrate wafers to keep the alignment; heating the aligned first and second photodefinable glass substrate wafers to flow the solder into a solid electrical and mechanical connection at the coax to CPW element; coating the joined first and second photodefinable glass substrate wafers with photoresist to expose the slot patterns; coating a second side of the first and second photodefinable glass substrate wafers with wax, photoresist or other material to protect the first and second photodefinable glass substrate wafers; etching the joined first and second photodefinable glass substrate wafers to remove the ceramic phase from the resonator, power divider and coax to CPW sections; removing the photoresist; exposing the one or more slot patterns on the joined first and second photodefinable glass substrate wafers; and etching the joined first and second photodefinable glass substrate wafers to open the one or more slot patterns. In one aspect, at least one of the first and second photodefinable glass wafers is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$. In another aspect, at least one of the first and second photodefinable glass wafers is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$. In another aspect, at least one of the first and second photodefinable glass wafers is at least one of: a photo-definable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1.

BRIEF DESCRIPTION OF THE DRAWINGS

For a more complete understanding of the features and advantages of the present invention, reference is now made to the detailed description of the invention along with the accompanying figures and in which:

FIG. 6L shows a cross-sectional view of the final matched ground plane and/or RF isolation structure.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

The present invention relates to creating a compact air cavity slotted antenna with a 50 Ohm launch and mini coaxial cable connector. Compact low loss air cavity slotted antennae are critical elements for high efficiency RF communication systems. Compact air cavity slotted antenna is a cornerstone technological requirement for future RF systems for portable systems, base station, test equipment and point-to-point communication.

Photosensitive glass structures have been suggested for a number of micromachining and microfabrication processes such as integrated electronic elements in conjunction with other elements systems or subsystems. Semiconductor microfabrication using thin film additive and subtractive processes on semiconductor, insulating or conductive substrates is expensive with low yield and a high variability in performance. This invention provides a cost effective glass ceramic air cavity slotted antenna device or as an array of air cavity slotted antenna for RF frequencies with low loss.

Figure 1:
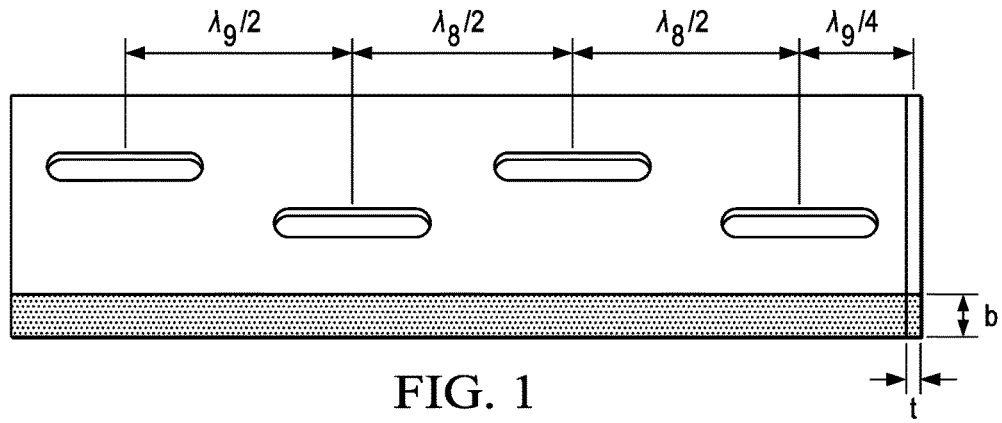
FIG. 1 shows a typical layout for a slotted antenna.
Figure 2:
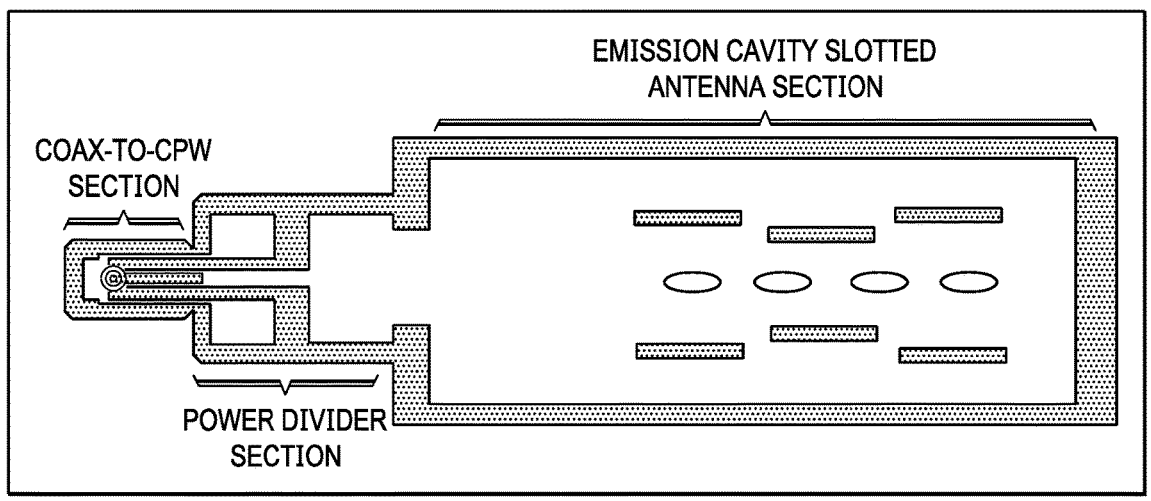
FIG. 2 shows a miniature air cavity slotted antenna.
Figure 3:
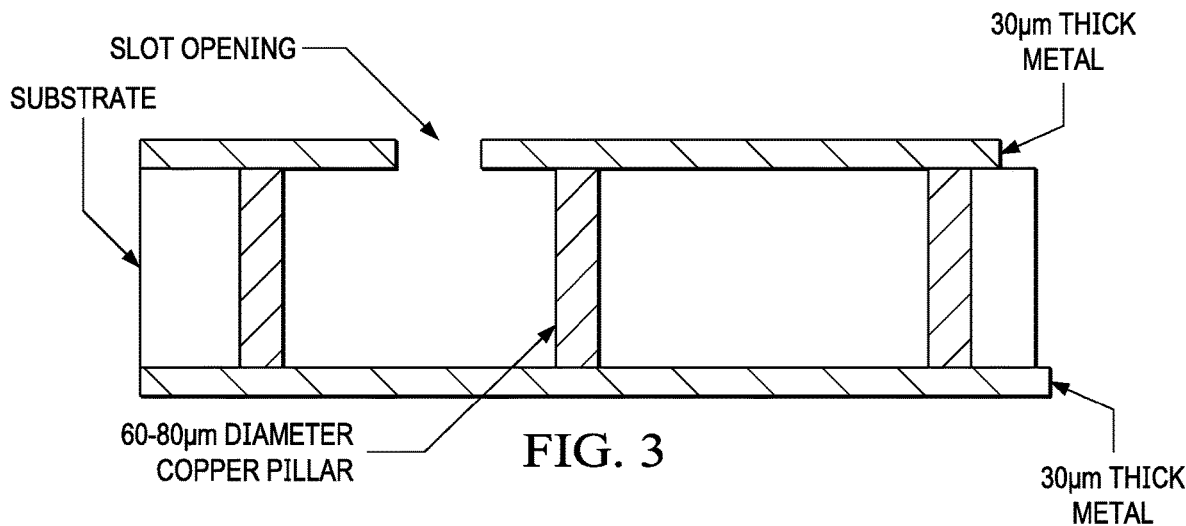
FIG. 3 shows a cross section miniature air cavity slotted antenna.
Figure 4A:
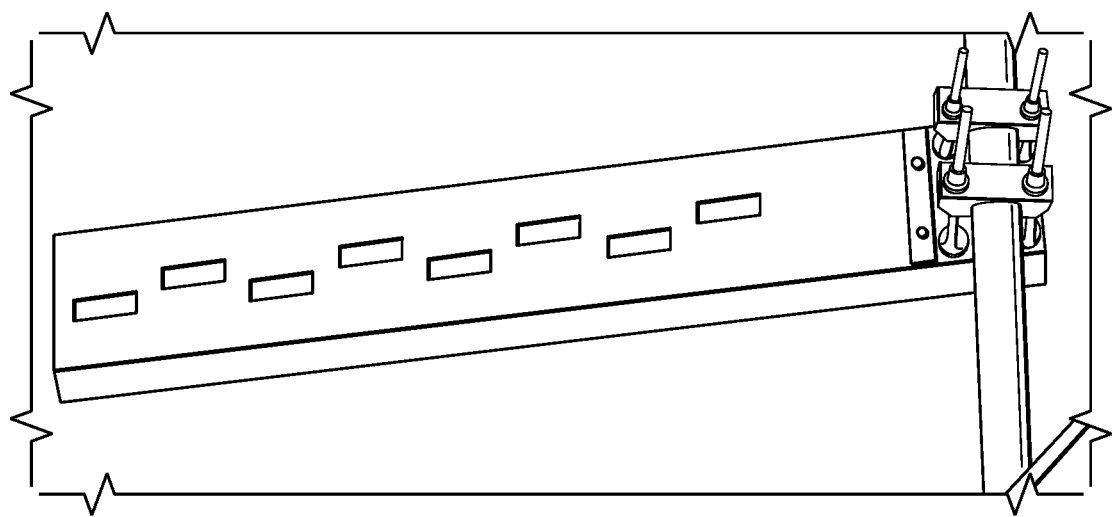
FIG. 4A shows a moderate size CNC machined metal air cavity slotted antenna.
Figure 4B:
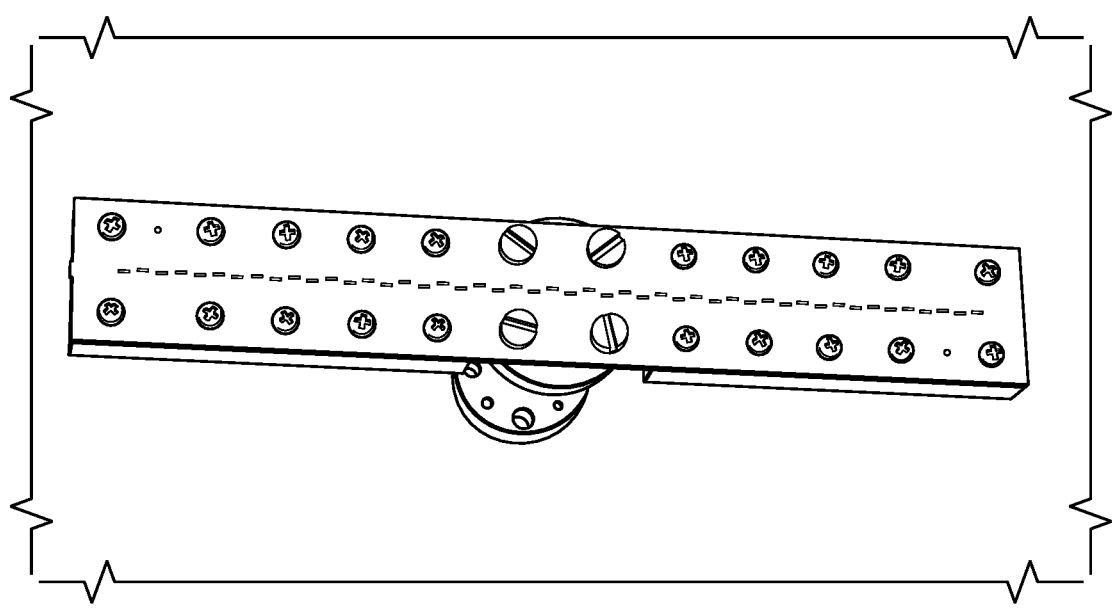
FIG. 4B shows a small CNC machined metal air cavity slotted antenna.
Figure 5A:
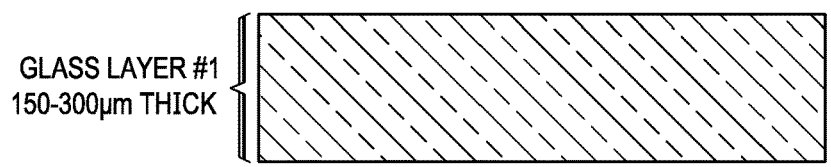
FIGS. 5A to 5L show an example of a method for making a single wafer slotted waveguide antenna structure with matched ground plane and/or RF isolation structure.
Figure 5B:
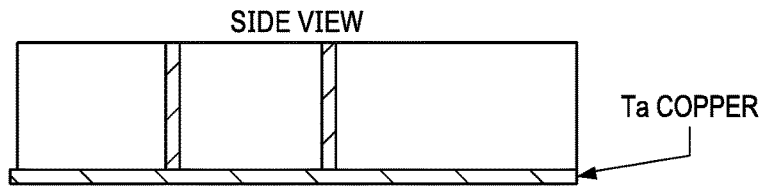
Figure 5B:
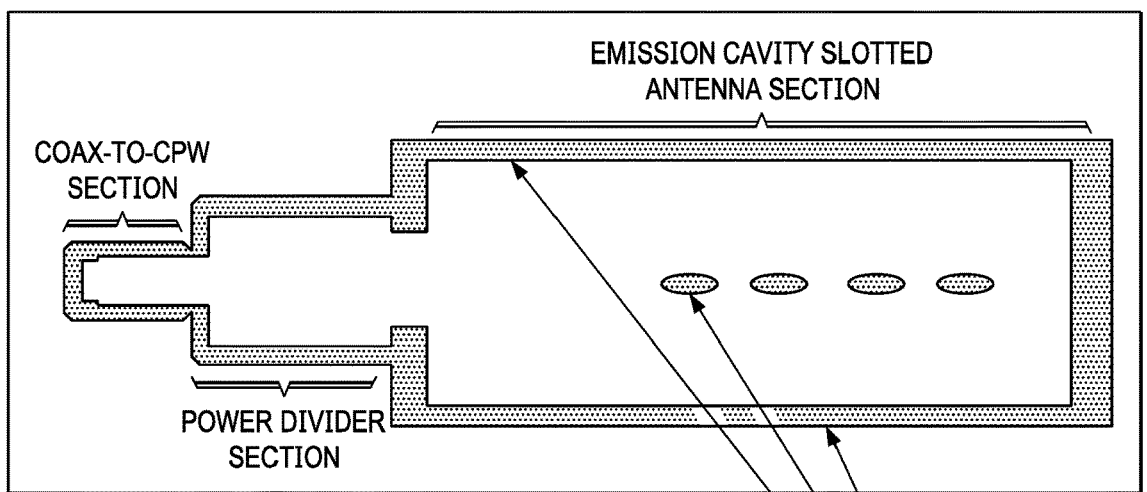
Figure 5C:
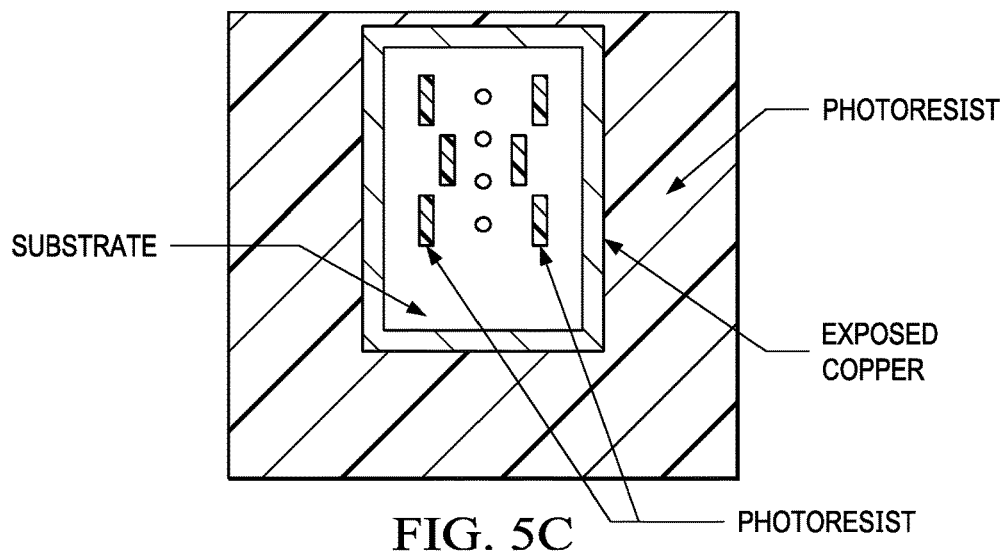
Figure 5D:
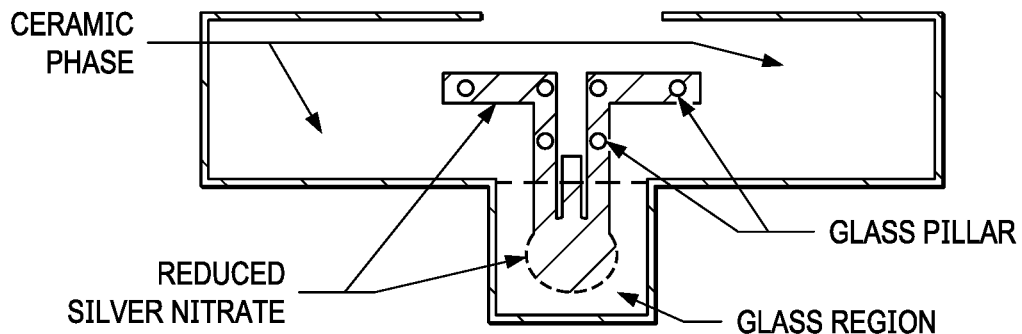
Figure 5E:
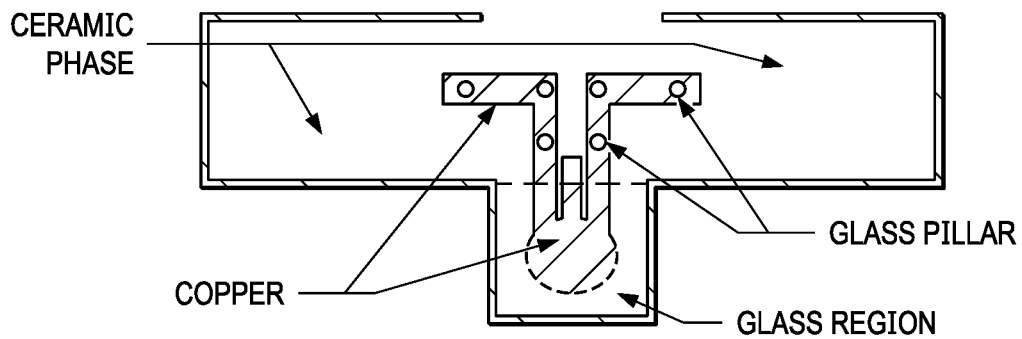
Figure 5F:
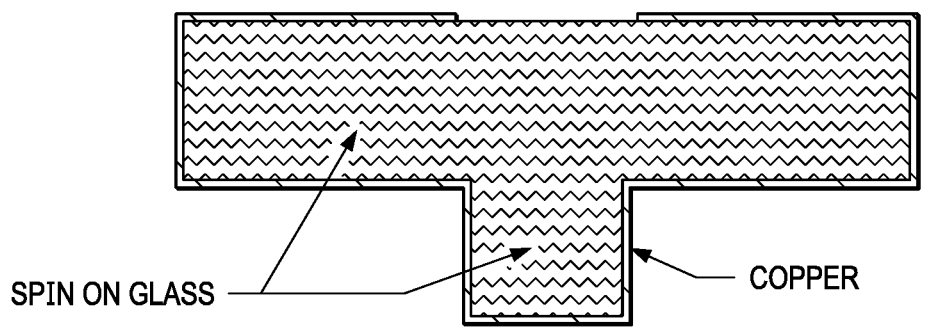
Figure 5G:
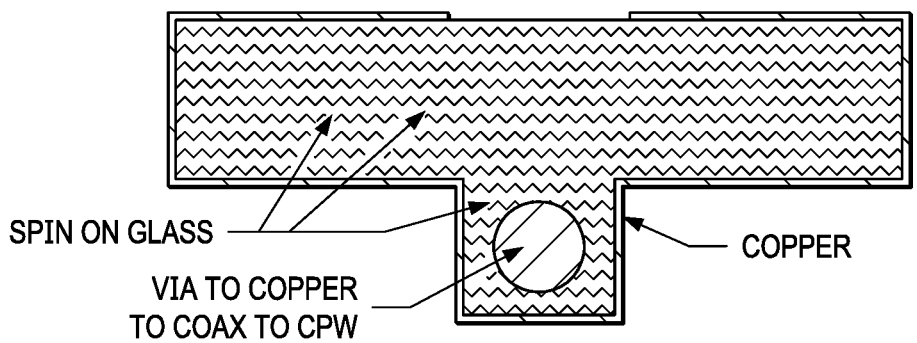
Figure 5H:
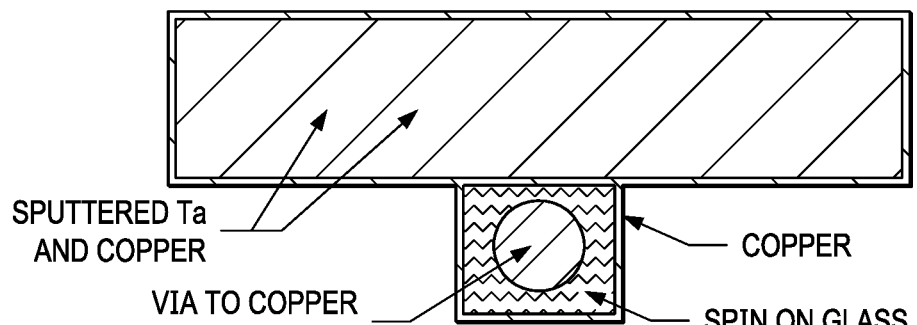
Figure 5I:
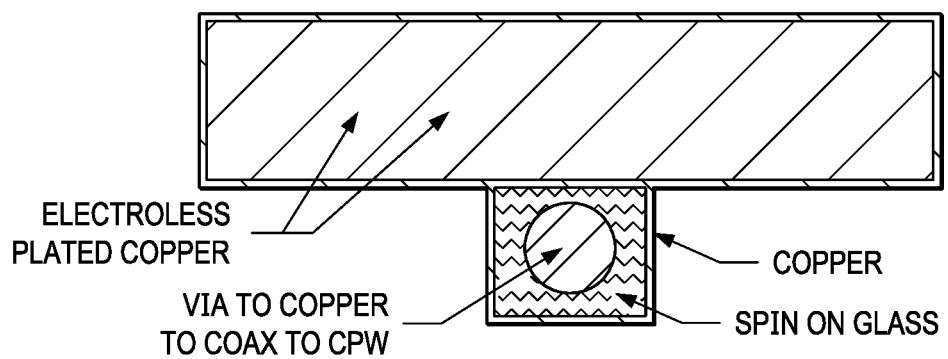
Figure 5J:
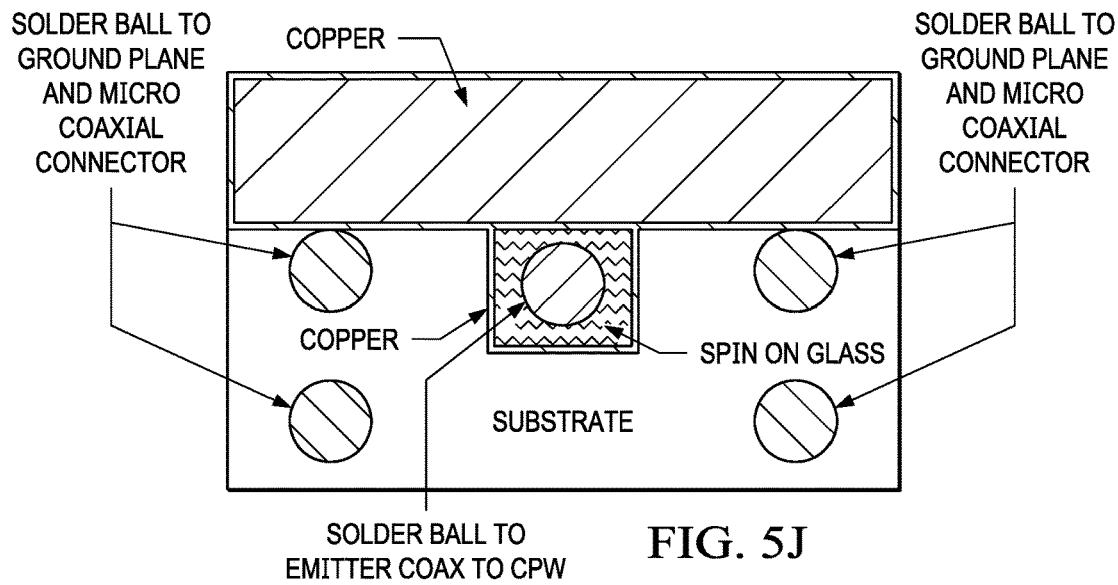
Figure 5K:
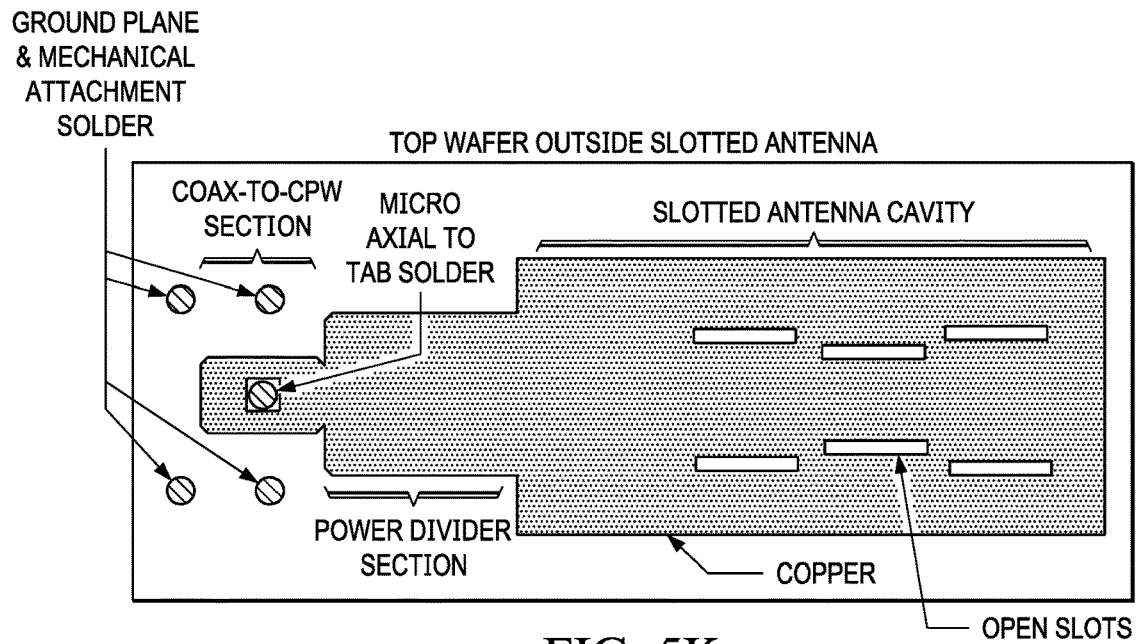
Figure 5L:
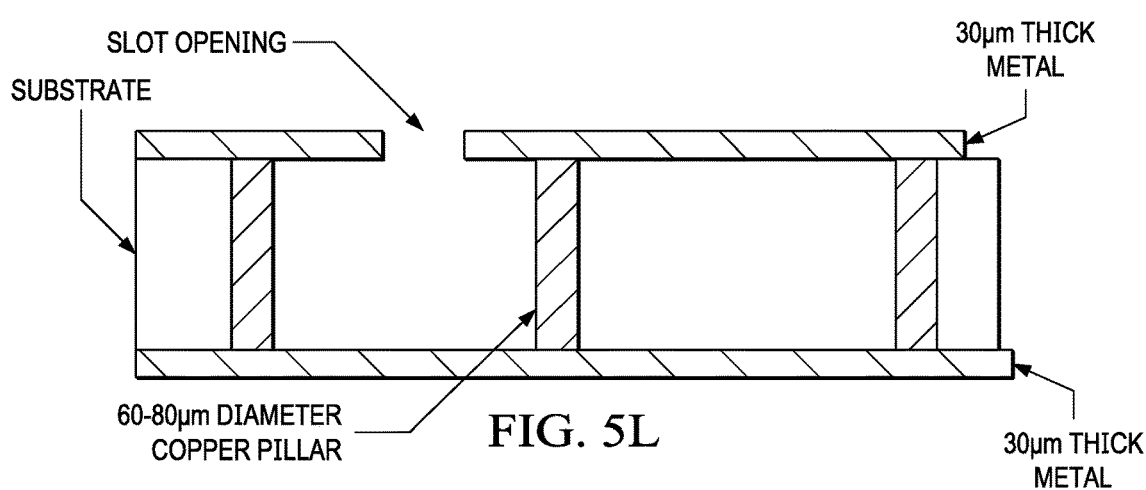
Figure 6A:
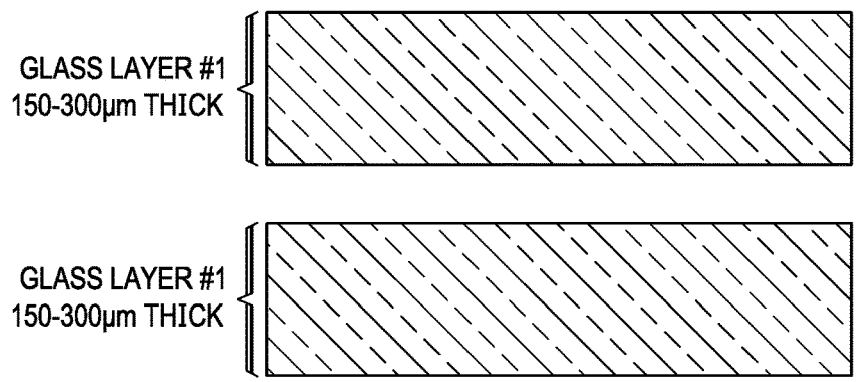
FIGS. 6A to 6I show an example of a method for making a two wafer slotted waveguide antenna structure with matched ground plane and/or RF isolation structure.
Figure 6B:
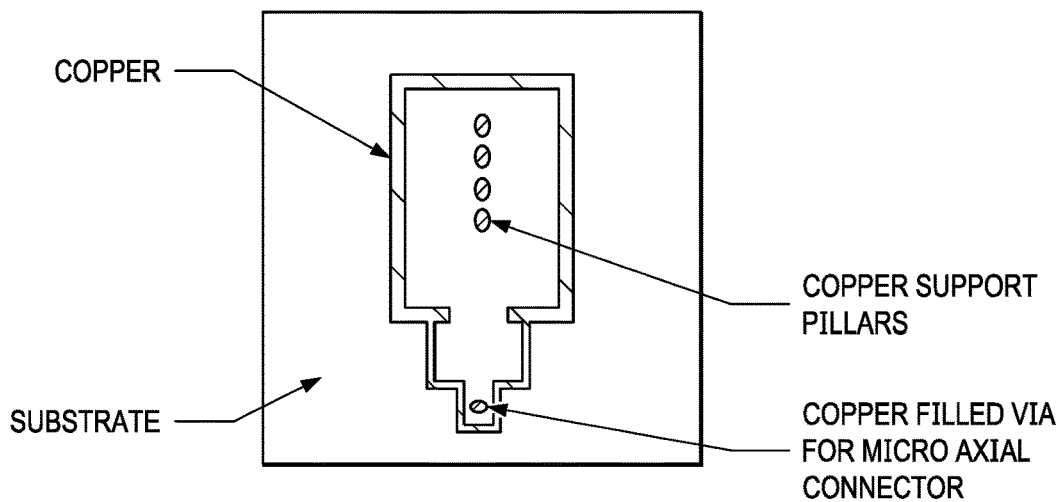
Figure 6C:
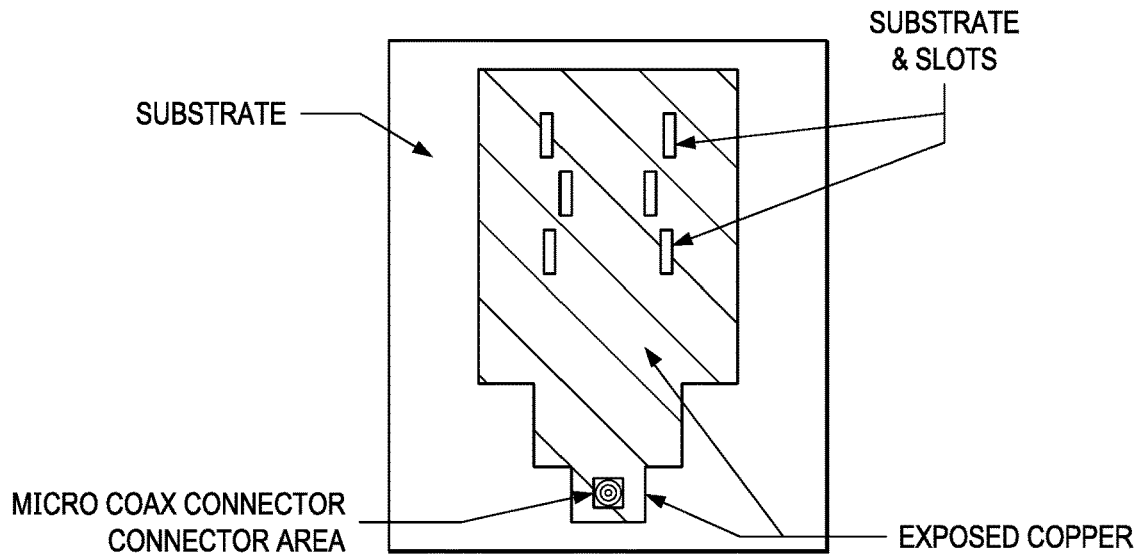
Figure 6D:
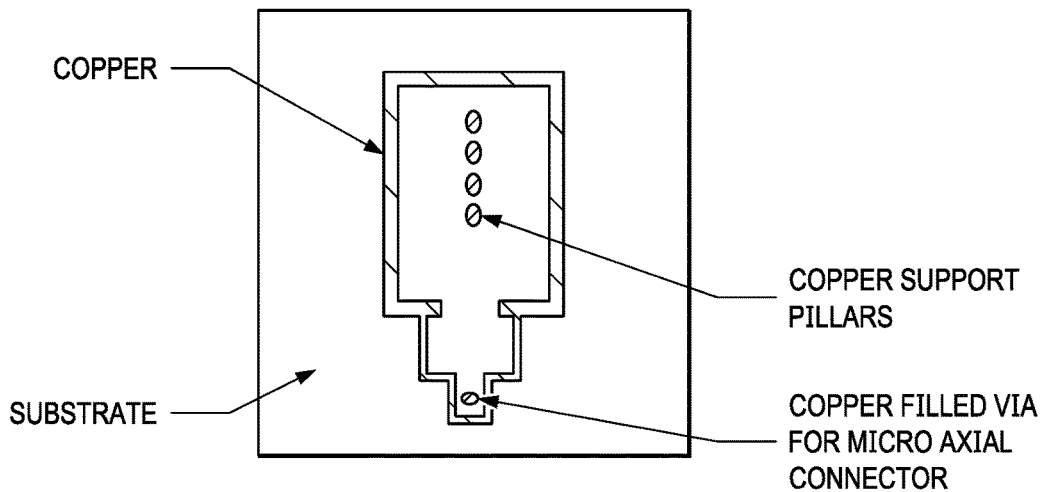
Figure 6E:
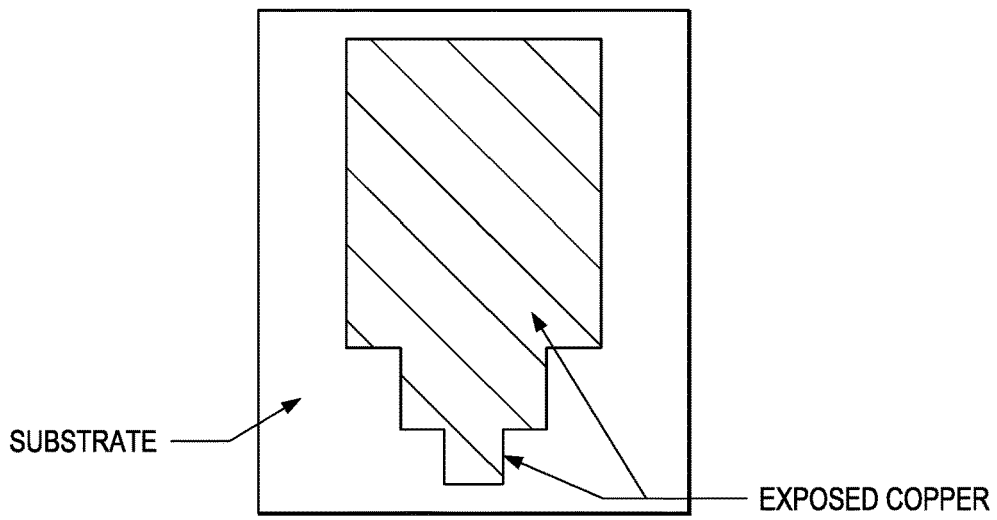
Figure 6F:
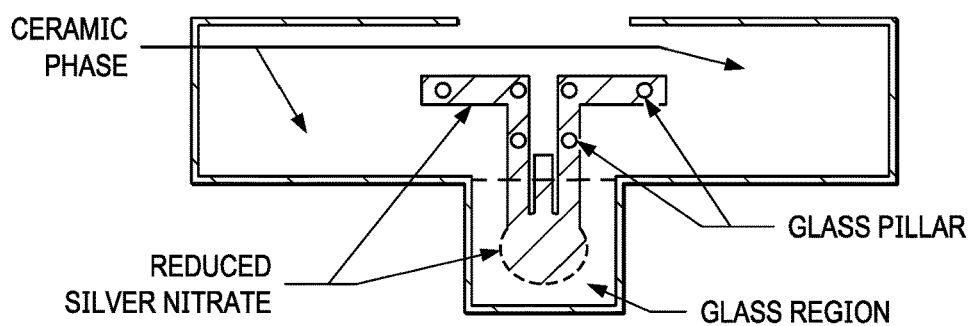
Figure 6G:
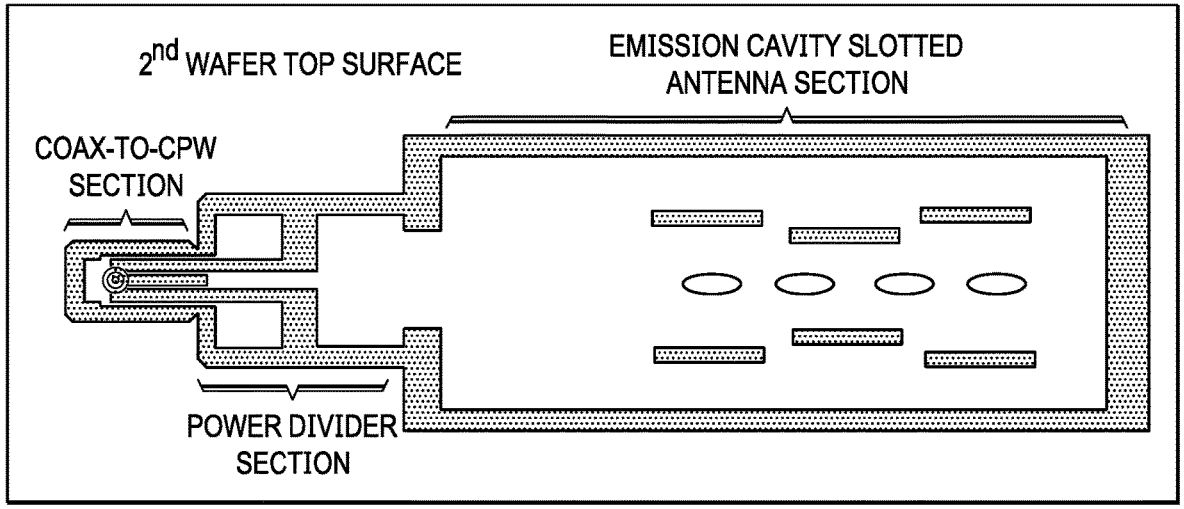
Figure 6H:
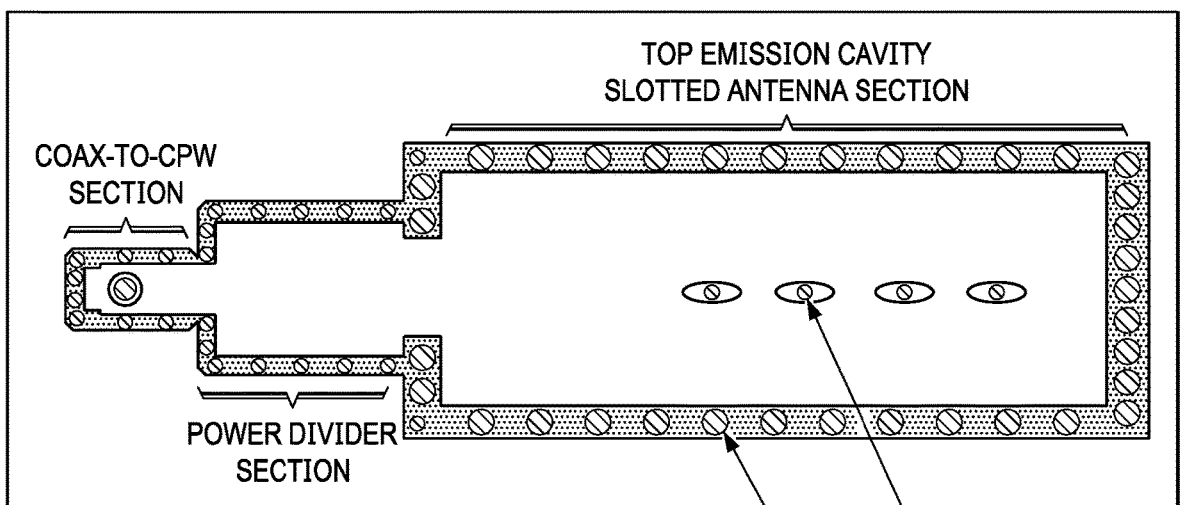
Figure 6I:
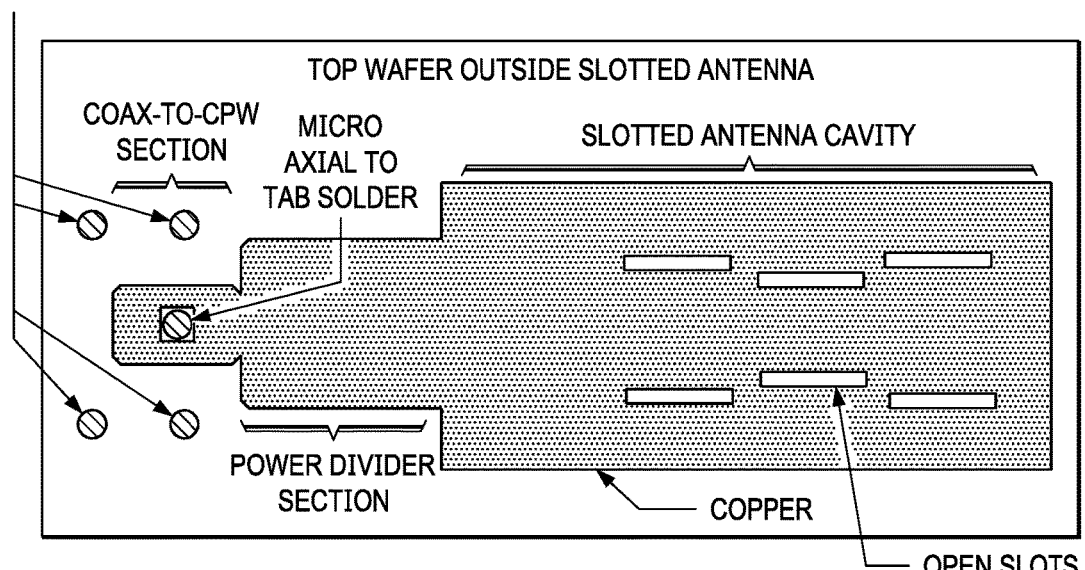
Figure 6J:
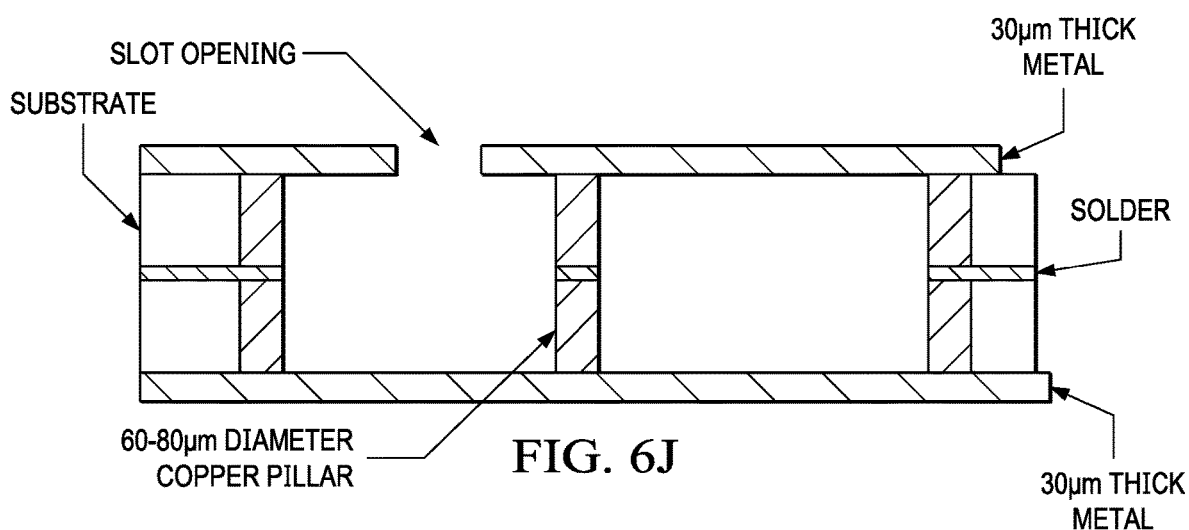
FIG. 6J shows a cross-sectional view of the final, two wafer matched ground plane and/or RF isolation structure.

FIG. 1 shows a typical layout for a slotted antenna. FIG. 2 shows a miniature air cavity slotted antenna. FIG. 3 shows a cross section miniature air cavity slotted antenna. FIG. 4A shows a moderate size CNC machined metal air cavity slotted antenna. FIG. 4B shows a small CNC machined metal air cavity slotted antenna. FIGS. 4A and 4B show a classic air cavity slotted antenna that could made using classic CNC machining. FIG. 2 shows the top view of a theoretical structure for a compact air cavity slotted antenna. FIG. 3 shows the cross section view of a theoretical structure for a compact air cavity slotted antenna a theoretical structure of a compact air cavity slotted antenna. The external dimensions of the compact air cavity slotted antenna are: 8 (l)×5.0 (w)×0.4 (h) $mm^3$. FIGS. 4A and 4B shows images of commercial slotted air cavity slotted antennas.

Traditional slotted air cavity slotted antenna use traditional machining and finishing techniques because of the relatively large spacing slotted air cavity antenna. Traditional slotted air cavity slotted antenna used precision machining metal and electropolished for surface finish easily produce and are self-supporting antenna due to the thickness of the metal structures. Thin film or additive/subtractive manufacturing technology produce resonate elements that are not mechanically or dimensionally stable. This mechanical or dimensional instability forced the use of a solid dielectric substrate/cavities creating large losses. This large amount of loss has precluded the development and production of a slotted air cavity antenna for commercial markets.

The width is a multiple of the free space wavelength of the emission frequency. The center-to-center spacing between the slots of λ/2.

The present invention includes a method to fabricate to compact slotted air cavity antenna photodefinable glass ceramic substrate. To produce the present invention the inventors developed a glass ceramic (APEX® Glass ceramic) as a novel packaging and substrate material for semiconductors, RF electronics, microwave electronics, and optical imaging. APEX® Glass ceramic is processed using first generation semiconductor equipment in a simple three step process and the final material can be fashioned into either glass, ceramic, or contain regions of both glass and ceramic. Photo-etchable glasses have several advantages for the fabrication of a wide variety of microsystems components. Although the current embodiment has been demonstrated in APEX glass due to it superior processing attributes but could be practice on other forms of photodefinable glass or by additive and subtractive thin film processes. The APEX glass approach has the lowest cost highest preforming slotted antennas.

Microstructures have been produced relatively inexpensively with these glasses using conventional semiconductor processing equipment. In general, glasses have high temperature stability, good mechanical and electrically properties, and have better chemical resistance than plastics and many metals. Photoetchable glass is comprised of lithium-aluminum-silicate glass containing traces of silver ions. When exposed to UV-light within the absorption band of ceriumoxide, the ceriumoxide acts as sensitizers, absorbing a photon and losing an electron that reduces neighboring silver oxide to form silver atoms, e.g.,

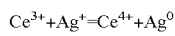

The silver atoms coalesce into silver nanoclusters during the baking process and induce nucleation sites for crystallization of the surrounding glass. If exposed to UV light through a mask, only the exposed regions of the glass will crystallize during subsequent heat treatment.

This heat treatment must be performed at a temperature near the glass transformation temperature (e.g., greater than 465° C. in air). The crystalline phase is more soluble in etchants, such as hydrofluoric acid (HF), than the unexposed dvitreous, amorphous regions. The crystalline regions etched greater than 20 times faster than the amorphous regions in 10% HF, enabling microstructures with wall slopes ratios of about 20:1 when the exposed regions are removed. See T. R. Dietrich et al., "Fabrication Technologies for Microsystems utilizing Photoetchable Glass", Microelectronic Engineering 30,497 (1996), which is incorporated herein by reference.

In general, photoetchable glass and is composed of silicon oxide ($SiO_2$) of 75-85% by weight, lithium oxide ($Li_2O$) of 7-11% by weight, aluminum oxide ($Al_2O_3$) of 3-6% by weight, sodium oxide ($Na_2O$) of 1-2% by weight, 0.2-0.5% by weight antimonium trioxide ($Sb_2O_3$) or arsenic oxide ($As_2O_3$), silver oxide ($Ag_2O$) of 0.05-0.15% by weight, and cerium oxide ($CeO_2$) of 0.01-0.04% by weight. As used herein the terms "APEX® Glass ceramic", "APEX glass" or simply "APEX" is used to denote one embodiment of the glass ceramic composition of the present invention.

The APEX composition provides three main mechanisms for its enhanced performance: (1) The higher amount of silver leads to the formation of smaller ceramic crystals which are etched faster at the grain boundaries, (2) the decrease in silica content (the main constituent etched by the HF acid) decreases the undesired etching of unexposed material, and (3) the higher total weight percent of the alkali metals and boronoxide produces a much more homogeneous glass during manufacturing.

The present invention includes a method for fabricating a low loss RF Filter structure in APEX Glass structure for use in forming interdigitated structures with mechanical stabilization and electrical isolation in a glass ceramic material used. The present invention includes metal structures to create in multiple planes of a glass-ceramic substrate, such process employing the (a) exposure to excitation energy such that the exposure occurs at various angles by either altering the orientation of the substrate or of the energy source, (b) a bake step and (c) an etch step. The slotted structures can be either symmetric or asymmetric. The mechanically stabilized structures are difficult, if not infeasible to create in most glass, ceramic, silicon substrates or other substrates. The present invention has created the capability to create such structures in both the vertical as well as horizontal plane for glass-ceramic substrates.

Ceramicization of the glass is accomplished by exposing a region of the APEX Glass substrate to approximately 20 J/cm² of 310 nm light. In one embodiment, the present invention provides a quartz/chrome mask containing a variety of concentric circles with different diameters.

The present invention includes a method for fabricating a compact efficient RF filters using mechanically stabilized interdigitated resonate structures connect different electronic devices fabricated in or attached to the photosensitive glass. The photosensitive glass substrate can have a wide number of compositional variations including but not limited to: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$. This and other varied compositions are generally referred to as the APEX glass.

The exposed portion may be transformed into a crystalline material by heating the glass substrate to a temperature near the glass transformation temperature. When etching the glass substrate in an etchant such as hydrofluoric (HF) acid, the anisotropic-etch ratio of the exposed portion to the unexposed portion is at least 30:1 when the glass is exposed to a broad spectrum mid-ultraviolet (about 308-312 nm) flood lamp to provide a shaped glass structure that have an aspect ratio of at least 30:1, and to provide a lens shaped glass structure. The exposed glass is then baked typically in a two-step process. Temperature range heated between of 420° C.-520° C. for between 10 minutes to 2 hours, for the coalescing of silver ions into silver nanoparticles and temperature range heated between 520° C.-620° C. for between 10 minutes and 2 hours allowing the lithiumoxide to form around the silver nanoparticles. The glass plate is then etched. The glass substrate is etched in an etchant, of HF solution, typically 5% to 10% by volume, where in the etch ratio of exposed portion to that of the unexposed portion is at least 30:1. Create the mechanically and thermally stabilized slot antenna resonate structure through thin film additive and subtractive processes requires the general processing approach.

There are multiple methods considered by the inventors to achieve a slotted antenna in photodefinable glass. One such embodiment uses a single wafer to create the slotted antenna. A second embodiment considered by the inventors uses a dual wafer structure to create the slotted antenna.

The present inventors used a photo-definable glass ceramic (APEX®) Glass Ceramic or other photo definable glass as a novel substrate material for semiconductors, RF electronics, microwave electronics, electronic components and/or optical elements. In general, a photo definable glass is processed using first generation semiconductor equipment in a simple three step process and the final material can be fashioned into either glass, ceramic, or contain regions of both glass and ceramic to create a slotted waveguide antenna structure with a matched ground plane comprising: forming in a photosensitive glass substrate a coaxial-to-coplanar waveguide (CPW) section connected to a power divider, an emission cavity while retaining one or more solder bumps at the vias that connect to the integrated ground plane.

Single Wafer.

A single wafer method of making the slotted antenna section of a compact slotted air cavity antenna (CSACA) starts with a lap and polished photodefinable glass substrate is shown in FIGS. 5A to 5L. Where the substrate between 150 and 300 µm thick with a surface roughness less than or equal to 50 nm and surface to surface parallel less than or equal to 10% with an RMS roughness <100 Å.

On a backside of the lapped and polished photodefinable glass wafer from, use a photomask to image at 310 nm light at a at least an intensity of 2 J/cm$^2$ to expose the sidewalls of the slotted antenna and support elements of the emission section of the slotted antenna.

The bottom of the substrate that has been coated with Ta and Copper. Where Ta is deposited by sputter deposition at a thickness between 50 Å and 750 Å preferably 250 Å. Where the copper is deposited by electroplating deposition at a thickness between 1 µm and 100 µm but preferably 30 µm. There are many RF CSACA die on a single 6" wafer. The specific number of die per wafer is a function of the wafer diameter and CSACA device design.

The wafer is then coated with a photoresist and the via and ground plane sidewall pattern for the CSACA is exposed and developed. The substrate is 6" in diameter is exposed with approximately 20 J/cm$^2$ of 310 nm light with a photo mask has a pattern of through hole via and ground plane sidewalls of the emission section CSACA device. The through hole via are between 30 µm and 120µ preferably 80 µm in diameter with a center-to-center spacing between 2,000 µm and 100 µm preferably at a 500 µm center-to-center spacing. Where the ground plane sidewalls are between 500 µm and 5 µm preferably at a 50 µm thick. The photoresist is then removed using a standard photoresist stripper.

The wafer is then annealed at temperature range heated between of 420° C.-520° C. for between 10 minutes to 2 hours, for the coalescing of silver ions into silver nanoparticles and temperature range heated between 520° C.-620° C. for between 10 minutes and 2 hours allowing the lithium oxide to form around the silver nanoparticles. The wafer is then cooled and placed into an HF bath to etch the ceramic portion of the wafer.

Then the via and ground plane sidewalls are filled using a copper electroplating process. The copper electroplating process grows the via and ground plane sidewalls from the backside copper rough the substrate.

The contact area between via and bottom ground plane is about 5% of the surface area contact to the final metal CSACA structure. The greater the number of stabilization structures, the higher the RF losses. As such we elect not to make the stabilization structure greater than 50% of the contact area of the CSACA structure and preferably less than 5%. The front of the wafer is then planarized using a CMP process to remove any excess copper.

The top of the is flood exposed with approximately 20 J/cm$^2$ of 310 nm light, The wafer is then annealed at temperature range heated between of 420° C.-520° C. in argon for between 10 minutes to 2 hours, for the coalescing of silver ions into silver nanoparticles and temperature range heated between 520° C.-620° C. in argon for between 10 minutes and 2 hours allowing the lithium oxide to form around the silver nanoparticles. This enables the formation of the ceramic phase of the photodefinable glass.

The wafer is then cooled and covered with a photoresist where it is exposed with the desired slot pattern for the CSACA using a standard photoresist process. This leaves a photoresist pattern where the slots will be in the CSACA. The wafer is placed in a sputtering chamber where a thin layer of Ta between 50 Å and 750 Å preferably 250 Å and a seed layer of copper between 0.5 µm and 5 µm preferably 2 µm of copper. The substrate is the placed into a photoresist stripper to leave the pattern of slots surrounded and outlined by a thin film of copper. The wafer is placed into a copper electroplating/electroless plating bath where an addition 15 µm to 50 µm preferably 25 µm is deposited on copper thin film. The wafer is then placed in a 10% HF solution where the ceramic portion is removed from the emission sections cavity. The wafer is then placed in a DI water rinse to neutralize/dilute the HF fluid. Then the wafer is placed into, e.g., a Isopropyl Alcohol (IPA) rinse to do a fluid exchange with any water. The wafer is then placed into a vacuum bake oven to remove any residual IPA. The bake oven is at 40° C. to 70° C. at a preferably 50° C. pressure ranging between 1 mtorr and 750 mtorr preferable 400 mtorr.

Processing the micro-coaxial cable to coplanar waveguide and power divider section are accomplished in a similar manner the emission section of the slotted antenna. The first processing step is to expose the interior of microcoaxial cable and power divider sections of the CSACA with a photo mask has a pattern of through hole via and ground plane sidewalls CSACA device.

The wafer is then placed into a copper electroplating bath where cooper is deposited at a thickness between 0.5 µm and 10 µm.

The ceramic portion of the exposed/converted glass is then etched away using 10% HF solution leaving the interdigitated, ground plane and input and output structures. The wafer is then rinsed and dried using DI water and IPA.

The wafer is then annealed at temperature range heated between of 420° C.-520° C. for between 10 minutes to 2 hours, for the coalescing of silver ions into silver nanoparticles and temperature range heated between 520° C.-620° C. for between 10 minutes and 2 hours allowing the lithiumoxide to form around the silver nanoparticles. The wafer is then cooled and placed into a 10% HF bath to etch the ceramic portion of the wafer. The wafer is then placed into a CVD deposition system for a deposition between 200 Å and 10,000 Å thick of titanium. The wafer is then coated with a photoresist and the via pattern is exposed and developed. The wafer is then placed into a copper-electroplating bath where between 25 µm and 35 µm of copper are deposited. The photoresist is then removed lifting off the majority of the cooper and leaving the cooper filled via. The wafer is then lapped and polished to remove any excess copper and planarize the surface of the glass and cooper filled via.

Figure 7:
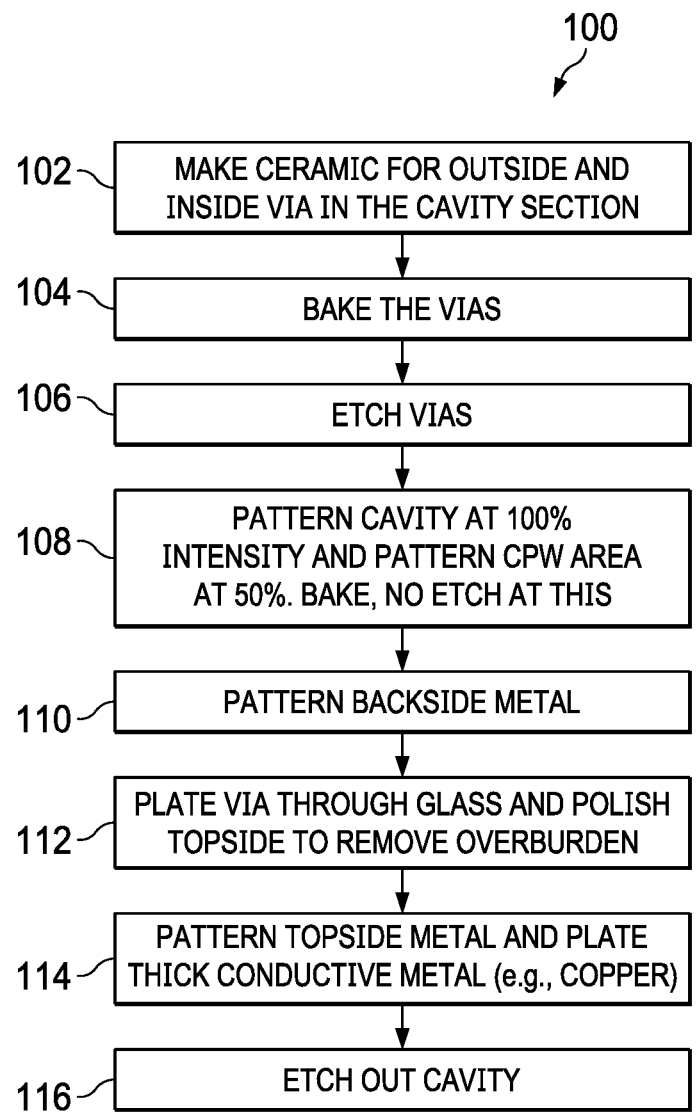
FIG. 7 is a flow chart of another method of the present invention for making a slotted waveguide antenna structure with matched ground plane and/or RF isolation structure.

The wafer is then exposed with approximately 20 J/cm$^2$ of 310 nm light to a photo mask consisting of a rectangular pattern of ~5.3 mm by ~2.2 mm. As can be seen in FIG. 7.

The wafer is then annealed, in Argon at temperature range heated between of 420° C.-520° C. for between 10 minutes to 2 hours, for the coalescing of silver ions into silver nanoparticles and temperature range heated between 520° C.-620° C. for between 10 minutes and 2 hours allowing the lithium oxide to form around the silver nanoparticles. The wafer is then cooled. A photoresist is then coated on the front of the wafer and the lid pattern is exposed and developed. The remaining photoresist covers the exposed and converted ceramic. Both sides of the wafer are coated with 200 Å and 10,000 Å thick of titanium using CVD process. The wafer is then placed into a copper-electroplating bath where cooper is deposited at a thickness between 0.5 µm and 20 µm. The photoresist is then removed lifting off the majority of the cooper and leaving the converted ceramic exposed and any unwanted remaining seed layer is removed using any number of well-established techniques. The ceramic portion of the exposed/converted glass is then etched away using 10% HF solution leaving the ground plane structures. The wafer is then rinsed and dried using DI water and IPA. Table 1 is a detailed step-by-step example of a protocol for manufacturing the slotted antenna using in a single wafer.

TABLE 1A

A single wafer slotted waveguide antenna structure with matched ground plane and/or RF isolation structure is created creating by:

| | |
|---|---|
| Step 1. | Start with lapped and polished photodefinable glass preferably APEX glass of between 150 and 300 p.m thick with a surface roughness less than or equal to 50 nm and surface to surface parallel less than or equal to 10% with an RMS roughness < 100A. See FIG. 5A |
| Step 2. | On backside of the photodefinable glass wafer from Step 1, use a photomask to image at 310 nm light at at least an intensity of 2 J/cm² to expose the sideswalls and support elements of the structure. |
| Step 3. | Thermal cycle above the glass transition temperature to convert the UV exposed glass to ceramic phase for outside, inside walls and the via of the entire structure section. |
| Step 4. | Uniformity deposit 250Å of Ta and 2 µm Copper by sputtering on the front side of the wafer/substrate. |
| Step 5. | Coat the substrate with photoresist to interior of the coax to CPW and power divider section. |
| Step 6. | Etch the sidewalls and via in the substrate in 10% HF. |
| Step 7. | Electroplate the sidewalls and support via from the sputtered copper layer. |
| Step 8. | Apply a photoresist and using a photomask cover everything but the coax to CPW and power Divider sections. |
| Step 9. | Exposing the photodefinable glass wafer image at 310 nm light at a at least an intensity of 2 J/cm² to expose the emission cavity of the structure. |
| Step 10. | Remove photoresist using a standard photoresist stripper. |
| Step 11. | Using a different mask expose the coax to CPW and power Divider sections to an intensity of 2 J/cm² to expose for approximately 50% of the time. |
| Step 12. | Remove photoresist using a standard photoresist stripper. |
| Step 13. | Thermal cycle above the glass transition temperature covert the UV exposed glass to ceramic phase for of step 8 and Step 11. See FIG. 5B |
| Step 14. | Coat the front of the wafer with photoresist exposing and developing the slots for the antenna by cover the slots regions with photoresist |
| Step 15. | Deposit 250Å of Ta and 2 µm Copper by sputtering on the front side of the wafer/substrate on the center part of the antenna form Step 14. |
| Step 16. | Remove photoresist |
| Step 17. | Electroplate 20 µm of copper on both sides of substrate on top of the sputtered copper in Step 15. |
| Step 18. | Coat the wafer with photoresist except for the field of the slotted antenna resonator cavity exposing the power divider and coax to CPW sections. |
| Step 19. | Etch the substrate in 10% HF half way through the substrate of the ceramic phase material created in Step 11 and Step 13. |
| Step 20. | Rinse the wafer with DI water. See FIG. 5C |
| Step 21 | Using a projection aligner expose the region a pattern of glass pillars and pillar regions. |

TABLE 1A-continued

A single wafer slotted waveguide antenna structure with matched ground plane and/or RF isolation structure is created creating by:

| | |
|---|---|
| Step 22 | Coat the wafer with a silver nitrate. Reduce the silver nitrate using IR source to produce a pattern of reduced silver on the power divider and coax to CPW sections. See FIG. 5D |
| Step 23 | Electroless plate copper on to the metallic silver |
| Step 24 | Heat the structure to 250° C. in argon to promote adhesion of silver copper structure. See FIG. 5E |
| Step 25 | Using a spin on glass 5i02 lightly etch the using a standard plasma etching process to expose the copper sidewalls around the power divider and coax to CPW sections. See FIG. 5G |
| Step 26 | Plasma etch down to the copper sidewalls. |
| Step 27 | Coat the wafer with photoresist and open the region over the spin on glass over where the contact is the tab for power divider and coax to CPW sections. |
| Step 28 | Plasma etch down to the copper contact/tab. |
| Step 29 | Remove the photoresist using a standard stripper the rinse with DI water |
| Step 30 | Using a photoresist to coat the wafer clearing a pattern over the power divider sections. |
| Step 31 | Sputter coat the wafer with 250Å of Ta the 2 µm of Copper. See FIG. 5H |
| Step 32 | Electroless plate copper on the exposed sputtered copper to 20 µm See FIG. 5I |
| Step 33 | Remove Photoresist using a standard Photoresist stripper |
| Step 34 | Rinse the wafer with DI water |
| Step 35 | Deposit solder bump bond by an ink jet printer. This solder bump is to make contact with the center electrode of the micro coaxial connector to the coax to CPW element. This solder ball may require repeated applications to fill the by to the copper tab of the coax to CPW element. |
| Step 36 | The wafer is the heat to allow the solder to flow making a solid electrical and mechanical connection to the tab of the coax to CPW element. This is generally between 225° C. and 235° C. for 30 secs. |
| Step 37 | Rinse the wafer in 10% HF, to remove all of the remain ceramic material and spin on glass from the cavity of the antenna. |
| Step 38 | Rinse the wafer in DI water and the IPA. Vacuum dry the wafer at 120° C. at 1 torr for 1 hour. |
| Step 39 | Deposit solder bump bond via an ink jet deposition process in 5 sites, four sites on the perimeter to make contact the ground plane and attach the micro coaxial connector to the substrate. The fifth solder bump is to make contact with the center electrode of the micro coaxial connector to the coax to CPW element. This solder ball may require repeated applications to fill the via to the copper tab of the coax to CPW element. See FIG. 5J |
| Step 40 | Attach the commercially available surface mount micro coaxial connector to the solder bumps See FIG. 5k |
| Step 41 | Dice the wafer into individual die. |

Two Wafer Method.

A two wafer method of making the slotted antenna section of a compact slotted air cavity antenna (CSACA) starts with a lap and polished photodefinable glass substrate is shown in FIGS. 6A to 6J. Where the substrate between 150 and 300 µm thick with a surface roughness less than or equal to 50 nm and surface to surface parallel less than or equal to 10% with an RMS roughness <100 Å. Table 2 is one example of a two wafer transmission structure with matched ground plane and/or RF isolation structure.

TABLE 2

In an example of Step-by-step method of making a slotted antenna of the present invention.

First Wafer

| | |
|---|---|
| Step 1. | Start with two lapped and polished photodefinable glass preferably APEX glass of between 150 and 150 µm thick with a surface roughness less than or equal to 50 nm and surface to surface parallel less than or equal to 10% with an RMS roughness < 100Å. Place photoresist or wax on the substrate's topside. |

TABLE 2-continued

In an example of Step-by-step method of making a slotted antenna of the present invention.

| | |
|---|---|
| Step 2. | Expose the pattern to the right in the side one of the first wafer glass wafer from Step 1, use a photomask to image at 310 nm light at a at least an intensity of 2 J/cm$^2$ to expose the emission cavity's sides and support elements of the structure. |
| Step 3. | Thermally cycle the substrate to convert the exposed material to a ceramic |
| Step 4. | Coat the First/Top substrate with photoresist, expose and develop the slots for RF emissions in the form to the right. |
| Step 5. | Expose and develop the pattern seen to the right into the substrate's of the top substrate from step 4. |
| Step 6. | Deposit 250A of Ta and 1 μm of Copper by sputtering on the top of the first wafer. |
| Step 7. | Electroplate 20 μm of copper |
| Step 8. | Coat the front of the wafer with wax, photoresist or other protective coating |
| Step 9. | Etch the via and support structures created in Step 3 and Step 2. |
| Step 10. | Electroplate the copper pillars and sidewalls from the copper layer in Step 7. |
| Step 11. | CMP the backside to be flat from Step 10. |
| Step 12. | Expose the cavity to the right in the side one of the first wafer glass wafer from Step 1, use a photomask to image at 310 nm light at a at least an intensity of 2 J/cm2 to expose the emission cavity, power divider and coax to CPW sections.. |
| Step 13. | Thermally cycle the substrate to convert the exposed material to a ceramic phase from the exposure in Step 12. This will be etched after the two wafers have been bonded together. |
| Second Wafer | |
| Step 1 | On the front surface of the 2nd wafer in the micro coaxial connector and power divider section use a photo mask to shield the areas that are identified as glass. Use 310 nm light at a at least an intensity of 2 J/cm$^2$ to expose the emission cavity's sidewalls and support elements structure. |
| Step 2 | Thermally cycle the substrate to convert the exposed material to a ceramic phase in Step 1. |
| Step 3 | Coat the First/Bottom substrate with photoresist expose and devlop the pattern seen to the right into the substrate's bottom side of the top substrate creating a pattern for the external copper slotted antenna. See the second figure. |
| Step 4 | Deposit 250A of Ta and 1 μm of Copper by sputtering on the top of the first wafer. |
| Step 5 | Remove the photoresist using a standard stripper |
| Step 6 | Electroplate 20 μm of copper |
| Step 7 | Coat the backside of the wafer with wax, photoresist or other protective coating from Step 6. |
| Step 8 | Etch the sidewalls and support pillar ceramic phase out created in Step 2 and Step 1. |
| Step 9 | Electroplate copper pillars and sidewalls from the copper on the front side of the second wafer |
| Step 10 | Rise with DI water and dry |
| Step 11 | CMP the backside to be flats |
| Step 12 | On the front surface of the 2$^{nd}$ wafer in the micro coaxial connector power divider section use a photo mask to shield the areas that are identified as glass. Seen to the Right. At the same time accomplish a flood expose antenna emission section. Use 310 nm light at a at least an intensity of 2 J/cm$^2$. |
| Step 13 | Thermally cycle the substrate to convert the exposed material to a ceramic phase in Step 1. |
| Step 14 | Deposit a photoresist on the front surface, using a mask create the image identified in light grey by exposing that pattern into the photoresist. |
| Step 15 | Then sputter deposit 250Å of Ta and 2 μm of Copper. |
| Step 16 | Remove photoresist using a standard photoresist stripper leaving the pattern in light grey. |
| Step 17 | Deposit 20 μm of copper using a electroless plate process |
| Step 18 | Place solder balls on the on the copper elements of the front surface of the first wafer |
| Step 19 | Accomplish wafer-to-wafer bonding using alignment fiducials and etched keyed structures. |
| Step 20 | Keep the wafers in compression and wafer is the heat them to allow the solder to flow making a solid electrical and mechanical connection to the tab of the coax to CPW element. This is generally between 225° C. and 235° C. for 30 secs. |
| Step 21 | Coat the joined substrates with photoresist exposing the slot patterns Coat the back side with wax or other material to protect the structure Place the joined wafer into 10% HF to etch the exposed substrate through the slots using to remove the ceramic phase from the resonator, power divider and coax to CPW sections. Rinse with DI water<br>Remove Photoresist using a standard Photoresist stripper<br>Rinse with DI water<br>Place substrate into a vacuum bake oven to remove any remaining fluid from the internal sections of slotted antenna. |
| Step 22 | Coat the substrate with photoresist exposing the slot patterns<br>Etch the exposed substrate through the slots<br>Rinse with DI water<br>Remove Photoresist using a standard Photoresist stripper<br>Rinse with DI water<br>Place substrate into a vacuum bake oven to remove any remaining fluid from the internal sections of slotted antenna |
| Step 23 | Cross Section View of the cavity |

FIG. 7 shows a flowchart 100 of the method of the present invention, in which Step 102 includes make a ceramic for outside and inside via in the cavity section. Next, in step 104, bake the vias. In step 106, etch the vias. In step 108, Pattern cavity at 100% intensity and pattern CPW area at 50%, bake, no etch at this time. In step 110, pattern the backside metal for the ground plane. In step 112, plate though glass and polish topside to remove overburden. In step 114, pattern topside metal and plate thick conductive metal (e.g., copper) with slots. And in step 116, etching out the cavity to form the slotted antenna in a single wafer.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A method of making a slotted waveguide antenna structure with matched ground plane comprising:
   forming in a photosensitive glass substrate a coaxial-to-coplanar waveguide (CPW) section connected to a power divider that is connected to an emission cavity area for the slotted antenna and one or more vias;
   depositing a metal ground plane to a first surface of the photosensitive glass substrate;
   depositing a copper layer on the photosensitive glass substrate with a pattern of slots that form a slot antenna above the emission cavity;
   forming one or more copper pillars in the emission cavity under the slot antenna;
   etching away the photosensitive glass in the emission cavity while retaining the one or more copper pillars;
   connecting a micro coaxial connector to the coaxial-to-coplanar waveguide (CPW) section; and one or more solder bumps at the vias that connect to the ground plane, to form a slotted antenna.

2. The method of claim 1, wherein the photodefinable glass substrate is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$.

3. The method of claim 1, wherein the photodefinable glass substrate is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$.

4. The method of claim 1, wherein the photodefinable glass substrate is at least one of: a photo-definable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1.

5. The method of claim 1, wherein the photodefinable glass substrate is a photosensitive glass ceramic composite substrate comprising at least one of silica, lithium oxide, aluminum oxide, or cerium oxide.

6. The method of claim 1, further comprising dicing one or more of the slotted antennas from the photodefinable glass substrate into individual slotted antennas.

7. The method of claim 1, wherein the slotted antenna comprises one or more slot openings above a cavity, wherein the slotted portion of the antenna is supported with one or more glass or copper pillars in the cavity.

8. A two-wafer method of making a slotted antenna comprising:

forming on a first surface of a first photodefinable glass substrate wafer: one or more copper support pillars in a cavity, one or more outside walls for the cavity, and a copper via for connecting a micro axial connector, and on a second surface of a first photodefinable glass substrate wafer a copper layer that comprises one or more antenna slots;

forming on a first surface of a second photodefinable glass substrate wafer: a micro axial connector and power divider section, a resonator cavity, side walls, and one or more support structures in the resonator cavity; and placing solder balls along a metal surface of an emission cavity slotted antenna section, the support structures in the cavity, a power divider section, and a coaxial-to-coplanar waveguide (CPW) of at least one of the first or second photodefinable glass substrate wafers;

aligning the first and second photodefinable glass substrate wafers at the slotted antenna; and compressing the first or second photodefinable glass substrate wafers at a temperature sufficient to flow the solder balls to connect the support structures in the cavity, a power divider section, and a coaxial-to-coplanar waveguide of the first and second photodefinable glass substrate wafers; and forming a slotted antenna on a surface of the second photodefinable glass substrate wafer opposite the cavity in the first photodefinable glass substrate wafer.

9. The method of claim 8, wherein the photodefinable glass substrate is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$.

10. The method of claim 8, wherein the photodefinable glass substrate is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$.

11. The method of claim 8, wherein the photodefinable glass substrate is at least one of: a photo-definable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1.

12. The method of claim 8, wherein the photodefinable glass substrate is a photosensitive glass ceramic composite substrate comprising at least one of silica, lithium oxide, aluminum oxide, or cerium oxide.

13. The method of claim 8, further comprising dicing one or more of the slotted antennas from the photodefinable glass substrate into individual slotted antennas.

14. The method of claim 8, wherein the slotted antenna comprises one or more slot openings above a cavity, wherein the slotted portion of the antenna is supported with one or more glass or copper pillars in the cavity.

15. A method of making a slotted waveguide antenna structure with matched ground plane comprising:

(1) masking a design layout comprising one or more structures to form one or more electrical conduction paths on a photodefinable glass substrate;

(2) exposing at least one portion of the photosensitive glass substrate to an activating energy source to expose one or more sidewalls and one or more support elements of an antenna structure;

(3) processing the photosensitive glass substrate to a heating phase above its glass transition temperature to convert a portion of the photodefinable glass substrate exposed the activating energy source into a ceramic, wherein the portion of the photodefinable glass formed into a ceramic comprises an outside, inside walls, and at least one via of the antenna structure;

(4) depositing a layer of tantalum and a layer of copper on a first side of the photodefinable glass substrate;

(5) coating the photodefinable glass substrate with a photoresist to form an interior of a coaxial-to-coplanar waveguide (CPW) connected to a power divider that is connected to an emission cavity for the slotted antenna;

(6) etching one or more sidewalls and one or more support vias in the substrate;

(7) depositing a photoresist the protects the coaxial-to-coplanar waveguide (CPW) and the power divider;

(8) exposing the photosensitive glass substrate to an activating energy source to expose the emission cavity for a time sufficient to form the cavity without crossing the wafer;

(9) removing the photoresist and processing the photosensitive glass substrate to a heating phase above its glass transition temperature to convert the photodefinable glass substrate exposed to the activating energy source into a ceramic;

(10) coating and exposing a photoresist on a second side of the photodefinable glass substrate with a pattern of slots that form a slot antenna;

(11) depositing a layer of tantalum and a layer of copper on the second side of the photodefinable glass substrate;

(12) removing the photoresist and electroplating with copper the photodefinable glass substrate;

(13) coating the photodefinable glass substrate with a photoresist except for the portion of the emission cavity, and exposing the power divider and coaxial to CPW sections;

(14) etching a portion of the photodefinable glass substrate formed into a ceramic for a time sufficient to form the emission cavity, without traversing the photodefinable glass substrate;

(15) rinsing the wafer with water or a solvent;

(16) using a projection aligner exposing a region with a pattern to form one or more glass pillars or glass pillar regions in the emission cavity;

(17) coating the photodefinable glass substrate to silver nitrate and reducing the silver nitrate to metallic silver on the photodefinable glass substrate with an infrared source on the power divider and coaxial to CPW sections;

(18) electroless plating copper on the metallic silver;

(19) heating the photodefinable glass substrate to at least 250° C. in argon to adhere the copper to the silver;

(20) etching with a spin on glass $SiO_2$ with a plasma etching process to expose the copper sidewalls around the power divider and coaxial to CPW sections;

(21) plasma etching down to one or more copper sidewalls;

(22) coating the photodefinable glass substrate with photoresist and open the region over the spin on glass over where a contact tab for the power divider and coaxial to CPW sections and plasma etching down to a copper tab;
(23) removing the photoresist using a standard stripper the rinse with water;
(24) coating the photodefinable glass substrate with a photoresist clearing a pattern over the power divider;
(25) sputtering coating the photodefinable glass substrate with tantalum and then copper;
(26) electroless plating copper on the sputtered copper;
(27) removing the photoresist and rinsing the photodefinable glass substrate with water;
(28) depositing a solder bump with an ink jet printer to form an electrical contact with a center electrode of a micro coaxial connector of the coaxial to CPW element;
(29) heating the photodefinable glass substrate to allow the solder bump to flow making a solid electrical and mechanical connection from the electrical contact of the coaxial to CPW element;
(30) rinsing the wafer in 10% HF, to remove all of the remain ceramic material and spin on glass from the antenna cavity;
(31) rinsing the wafer with water and alcohol; and
(32) depositing a solder bump bond with an ink jet deposition process at a perimeter of the slotted antenna to make contact with a ground plane and to attach the micro coaxial connector to the photodefinable glass substrate; and at the center electrode of the micro coaxial connector to the coax to CPW element;
(33) attaching a surface mount micro coaxial connector to the solder bumps, to provide a coaxial connector to the slotted antenna.

16. The method of claim 15, wherein the activating energy source is a UV light.

17. The method of claim 15, wherein the photodefinable glass substrate is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$.

18. The method of claim 15, wherein the photodefinable glass substrate is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$.

19. The method of claim 15, wherein the photodefinable glass substrate is at least one of: a photo-definable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1.

20. The method of claim 15, wherein the photodefinable glass substrate wafer is a photosensitive glass ceramic composite substrate comprising at least one of silica, lithium oxide, aluminum oxide, or cerium oxide.

21. The method of claim 15, further comprising dicing one or more of the slotted antennas from the first and second photodefinable glass substrate wafers into individual slotted antennas.

22. The method of claim 15, wherein the slotted antenna comprises one or more slot openings above a cavity, wherein the slotted portion of the antenna is supported with one or more glass or copper pillars in the cavity formed between the first and second photodefinable glass substrate wafers.

23. A two-wafer method of making a slotted antenna comprising:
(1) processing a first photodefinable glass substrate wafer by:
    depositing a photoresist or wax on a first surface of a first photodefinable glass substrate wafer;
    exposing a pattern on the first photodefinable glass substrate wafer to expose one or more sides of an emission cavity, one or more vias, and one or more support structures of an antenna structure;
    thermally cycling the first photodefinable glass substrate wafer to convert the exposed material to a ceramic;
    coating, exposing and developing a photoresist on the first side of the first photodefinable glass substrate wafer into slots for RF emissions;
    depositing tantalum and copper on the photoresist by sputtering on the first surface of the first photodefinable glass substrate wafer;
    electroplating copper on the first photodefinable glass substrate wafer;
    coating the first surface of the first photodefinable glass substrate wafer with a wax, a photoresist or other protective coating;
    etching the one or more vias and the one or more support structures;
    electroplating the one or more vias and the one or more support structures and the one or more sidewalls of the antenna;
    performing chemical-mechanical polishing of a second surface of the first photodefinable glass substrate wafer opposite the first surface of the first photodefinable glass substrate wafer;
    exposing the emission cavity to an activating energy to expose the emission cavity, a power divider and a coaxial-to-coplanar waveguide (CPW) section;
    thermally cycling the first photodefinable glass substrate wafer to convert the exposed material to a ceramic phase;
(2) processing a second photodefinable glass substrate wafer by:
    forming on a first surface of the second photodefinable glass substrate wafer a micro coaxial connector and power divider section with a photo mask;
    exposing one or more sidewalls of an emission cavity, and one or more support structures;
    thermally cycle the second photodefinable glass substrate wafer to convert the exposed material to a ceramic phase;
    coating, exposing and developing a photoresist on a second surface of the second photodefinable glass substrate wafer substrate with a pattern for an external copper slotted antenna;
    depositing tantalum and copper on the photoresist by sputtering on the first surface of the second photodefinable glass substrate wafer;

removing the photoresist using a standard stripper and electroplating copper on the second photodefinable glass substrate wafer;

coating a second surface of the second photodefinable glass substrate wafer with a wax, a photoresist or other protective coating;

etching the one or more sidewalls and one or more support pillars;

electroplating the one or more pillars and one or more sidewalls from the copper on the first surface of the second photodefinable glass substrate wafer;

rinsing with water and drying the second photodefinable glass substrate wafer;

flattening a second surface of the second photodefinable glass substrate wafer my chemical-mechanical polishing;

coating, exposing and developing a photoresist on the first surface of the second photodefinable glass substrate wafer to shield the micro coaxial connector power divider section;

exposing the second photodefinable glass substrate wafer to an activating energy;

thermally cycling the second photodefinable glass substrate wafer to convert the exposed material to a ceramic phase;

depositing tantalum and copper on the photoresist by sputtering on the first surface of the second photodefinable glass substrate wafer;

removing the photoresist using a standard stripper and electroplating copper on the second photodefinable glass substrate wafer to expose the openings; and (3) connecting the first and second photodefinable glass substrate wafers, by:

placing solder balls on the copper elements of the front surface of the first photodefinable glass substrate wafer;

using alignment fiducials and etched keyed structure to align the first and second photodefinable glass substrate wafers;

compressing the first and second photodefinable glass substrate wafers to keep the alignment;

heating the aligned first and second photodefinable glass substrate wafers to flow the solder into a solid electrical and mechanical connection at the coax to CPW element;

coating the joined first and second photodefinable glass substrate wafers with photoresist to expose the slot patterns;

coating a second side of the first and second photodefinable glass substrate wafers with wax, photoresist or other material to protect the first and second photodefinable glass substrate wafers;

etching the joined first and second photodefinable glass substrate wafers to remove the ceramic phase from the resonator, power divider and coax to CPW sections;

removing the photoresist;

exposing the one or more slot patterns on the joined first and second photodefinable glass substrate wafers; and etching the joined first and second photodefinable glass substrate wafers to open the one or more slot patterns.

24. The method of claim 23, wherein at least one of the first and second photodefinable glass wafers is a glass substrate comprising a composition of: 60-76 weight % silica; at least 3 weight % $K_2O$ with 6 weight %-16 weight % of a combination of $K_2O$ and $Na_2O$; 0.003-1 weight % of at least one oxide selected from the group consisting of $Ag_2O$ and $Au_2O$; 0.003-2 weight % $Cu_2O$; 0.75 weight %-7 weight % $B_2O_3$, and 6-7 weight % $Al_2O_3$; with the combination of $B_2O_3$; and $Al_2O_3$ not exceeding 13 weight %; 8-15 weight % $Li_2O$; and 0.001-0.1 weight % $CeO_2$.

25. The method of claim 23, wherein at least one of the first and second photodefinable glass wafers is a glass substrate comprising a composition of: 35-76 weight % silica, 3-16 weight % $K_2O$, 0.003-1 weight % $Ag_2O$, 8-15 weight % $Li_2O$, and 0.001-0.1 weight % $CeO_2$.

26. The method of claim 23, wherein at least one of the first and second photodefinable glass wafers is at least one of: a photo-definable glass substrate comprises at least 0.1 weight % $Sb_2O_3$ or $As_2O_3$; a photo-definable glass substrate comprises 0.003-1 weight % $Au_2O$; a photo-definable glass substrate comprises 1-18 weight % of an oxide selected from the group consisting of CaO, ZnO, PbO, MgO, SrO and BaO; and optionally has an anisotropic-etch ratio of exposed portion to said unexposed portion is at least one of 10-20:1; 21-29:1; 30-45:1; 20-40:1; 41-45:1; and 30-50:1.

* * * * *